US009374835B2

(12) United States Patent
Mallya et al.

(10) Patent No.: US 9,374,835 B2
(45) Date of Patent: *Jun. 21, 2016

(54) METHODS AND APPARATUS FOR ENFORCING A COMMON USER POLICY WITHIN A NETWORK

(71) Applicant: Juniper Networks, Inc., Sunnyvale, CA (US)

(72) Inventors: Raghavendra Mallya, Cupertino, CA (US); James Murphy, Alameda, CA (US); Abhijit Choudhury, Cupertino, CA (US); Pranay Pogde, Sunnyvale, CA (US); Phalguni Nanda, San Jose, CA (US); Jayabharat Boddu, Los Altos, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,193

(22) Filed: Aug. 7, 2014

(65) Prior Publication Data

US 2014/0348111 A1   Nov. 27, 2014

Related U.S. Application Data

(63) Continuation of application No. 13/252,856, filed on Oct. 4, 2011, now Pat. No. 8,804,620.

(51) Int. Cl.
*H04W 74/00* (2009.01)
*H04L 29/06* (2006.01)
(Continued)

(52) U.S. Cl.
CPC ............. *H04W 74/002* (2013.01); *H04L 29/06* (2013.01); *H04L 63/20* (2013.01); *H04W 12/08* (2013.01); *H04W 80/04* (2013.01)

(58) Field of Classification Search
USPC ........................................................ 370/328
See application file for complete search history.

(56) References Cited

U.S. PATENT DOCUMENTS 7,039,053 B1 * 5/2006 Freed .................. H04L 41/0893
370/392
7,068,624 B1   6/2006 Dantu et al.
(Continued)

FOREIGN PATENT DOCUMENTS

CN      1825798 A    8/2006
CN    101674249 A    3/2010
(Continued)

OTHER PUBLICATIONS

Tarek Saad et al. "Tunneling Techniques for End-to-End VPNs: Generic Deployment in an Optical Testbed Environment" Broadband Networks, 2005 2nd International Conference, Boston, MA, Oct. 3-7, 2005, IEEE, Oct. 3, 2005, ISBN 978-0-7803-9276-2, pp. 924-930.

(Continued)

*Primary Examiner* — Habte Mered
*Assistant Examiner* — Brian Cox
(74) *Attorney, Agent, or Firm* — Cooley LLP

(57) ABSTRACT

In some embodiments, an apparatus includes a core network node configured to be operatively coupled to a set of wired network nodes and a set of wireless network nodes. The core network node is configured to receive, at a first time, a first data packet to be sent to a wired device operatively coupled to a wired network node from the set of wired network nodes. The core network node is configured to also receive, at a second time, a second data packet to be sent to a wireless device operatively coupled to a wireless network node from the set of wireless network nodes. The core network node is configured to apply a common policy to the first data packet and the second data packet based on an identifier of a user associated with both the wireless device and the wired device.

18 Claims, 7 Drawing Sheets

(51) Int. Cl.
*H04W 80/04* (2009.01)
*H04W 12/08* (2009.01)

(56) References Cited

U.S. PATENT DOCUMENTS

| | | | |
|---|---|---|---|
| 7,792,985 | B2 | 9/2010 | Liu |
| 8,233,455 | B2 | 7/2012 | Shaheen et al. |
| 2002/0071427 | A1 | 6/2002 | Schneider et al. |
| 2002/0191572 | A1 | 12/2002 | Weinstein et al. |
| 2002/0194367 | A1 | 12/2002 | Nakamura et al. |
| 2004/0264388 | A1 | 12/2004 | Rover et al. |
| 2005/0060390 | A1 | 3/2005 | Vakil et al. |
| 2005/0265365 | A1 | 12/2005 | Wan |
| 2007/0153738 | A1 | 7/2007 | Barker, Jr. et al. |
| 2007/0253432 | A1 | 11/2007 | Regale et al. |
| 2007/0268878 | A1 | 11/2007 | Clements |
| 2008/0259938 | A1 | 10/2008 | Keene et al. |
| 2009/0059848 | A1 | 3/2009 | Khetawat et al. |
| 2009/0073989 | A1 | 3/2009 | Cai et al. |
| 2009/0252133 | A1 | 10/2009 | Watanabe et al. |
| 2009/0303880 | A1 | 12/2009 | Maltz et al. |
| 2009/0310535 | A1 | 12/2009 | Anumala et al. |
| 2009/0316604 | A1* | 12/2009 | Singh .............. H04W 68/00 370/254 |
| 2010/0054207 | A1 | 3/2010 | Gupta et al. |
| 2010/0057907 | A1 | 3/2010 | Ross et al. |
| 2010/0180016 | A1 | 7/2010 | Bugwadia et al. |
| 2010/0246545 | A1 | 9/2010 | Berzin |
| 2010/0250733 | A1 | 9/2010 | Turanyi et al. |
| 2010/0281251 | A1 | 11/2010 | Arauz Rosado |
| 2010/0290398 | A1* | 11/2010 | Choudhary et al. ......... 370/328 |
| 2010/0293293 | A1 | 11/2010 | Beser |
| 2010/0306408 | A1 | 12/2010 | Greenberg et al. |
| 2011/0103284 | A1 | 5/2011 | Gundavelli et al. |
| 2011/0116442 | A1 | 5/2011 | Caldwell et al. |
| 2011/0134797 | A1 | 6/2011 | Banks et al. |
| 2011/0161657 | A1 | 6/2011 | So |
| 2011/0270996 | A1 | 11/2011 | Kim et al. |
| 2012/0063451 | A1 | 3/2012 | Keesara et al. |
| 2012/0198516 | A1 | 8/2012 | Lim |
| 2012/0198518 | A1* | 8/2012 | Faith et al. .................. 726/2 |
| 2013/0028079 | A1* | 1/2013 | Paredes .................. 370/230 |
| 2013/0083691 | A1 | 4/2013 | Murphy et al. |
| 2013/0083700 | A1 | 4/2013 | Sindhu et al. |
| 2013/0083724 | A1 | 4/2013 | Sindhu et al. |
| 2013/0083782 | A1 | 4/2013 | Murphy et al. |

FOREIGN PATENT DOCUMENTS

| | | |
|---|---|---|
| CN | 101888625 A | 11/2010 |
| EP | 2 252 096 A1 | 11/2010 |
| WO | WO2010/068018 A2 | 6/2010 |
| WO | WO2011/056334 A1 | 5/2011 |

OTHER PUBLICATIONS

Albert Greenberg et al. "Towards a Next Generation Data Center Architecture: Scalability and Commoditization" SIGCOMM '08: Proceedings of the 2008 SIGCOMM Conference and Co-Located Workshops NSDR'08, WOSN'08, MOBIARCH'08, NETECON'08, & PRESTO'08; Seattle, WA, Aug. 17-22, 2008, New York, NY: ACM, Aug. 17, 2008, ISBN: 978-1-60558-181-1, pp. 57-62.

Greenberg A. et al. "VL2: a scalable and flexible data center network," SIGCOMM 2009, Aug. 17-21, 2009, Barcelona, Spain, ACM, New York, NY, ISBN: 978-1-60558-594-9, vol. 39, No. 4, Aug. 17, 2009, pp. 51-62.

Linda Dunbar: "Directory Server Assisted TRILL edge", Mar. 7, 2011, Retrieved from the internet: URL: <http://tools.jetf.org/pdf/draft-dunbar-trill-server-assisted-edge-00.pdf> [Retrieved on Sep. 30, 2011], 7 pages.

Office Action for U.S. Appl. No. 13/252,852, mailed Apr. 23, 2013.
Final Office Action for U.S. Appl. No. 13/252,852, mailed Oct. 25, 2013.
Office Action for U.S. Appl. No. 13/252,854, mailed Apr. 9, 2013.
Office Action for U.S. Appl. No. 13/252,854, mailed Sep. 30, 2013.
Non-Final Office Action for U.S. Appl. No. 13/252,857, mailed Dec. 13, 2013.
Extended Search Report for European Application No. 12169451.7, mailed Dec. 12, 2012.
Extended Search Report for European Application No. 12168436.9, mailed Oct. 25, 2013.
Extended Search Report for European Application No. 12169903.7, mailed Jan. 7, 2013.
Michael Bahr, "Update on the Hybrid Wireless Mesh Protocol of IEEE 802.11s," Siemens Corporate Technology, Information & Communications, IEEE 1-4244-1455-5/07, © 2007, 6 pages.
Myung J. Lee et al., Wireless Mesh Networking, "Emerging Standards for Wireless Mesh Technology," IEEE Wireless Communications, Apr. 2006 (pp. 56-63).
Krishna Sankar et al. "Cisco Wireless LAN Security Expert guidance for securing your 802.11 networks," Chapter 9, SWAN: End-to-End Security Deployment, Copyright 2005, Cisco Systems, Inc., Cisco Press, pp. 233-253.
U.S. Appl. No. 13/252,852, filed Oct. 4, 2011 entitled "Methods and Apparatus for a Converged Wired/Wireless Enterprise Network Architecture".
U.S. Appl. No. 13/252,854, filed Oct. 4, 2011 entitled "Methods and Apparatus for a Self-Organized Layer-2 Enterprise Network Architecture".
U.S. Appl. No. 13/252,857, filed Oct. 4, 2011 entitled "Methods and Apparatus for a Scalable Network With Efficient Link Utilization".
U.S. Appl. No. 13/252,860, filed Oct. 4, 2011 entitled "Methods and Apparatus for Centralized Management of Access and Aggregation Network Infrastructure".
European Office Action for EP12169903.7 corresponding to U.S. Appl. No. 13/252,857.
First Office Action for Chinese Application No. 201210173178.7, mailed Jan. 7, 2015.
First Office Action for Chinese Application No. 201210173641.8, dated Feb. 12, 2015.
Office Action for U.S. Appl. No. 13/252,852, mailed Aug. 5, 2014.
Final Office Action for U.S. Appl. No. 13/252,852, mailed Feb. 23, 2015.
Final Office Action for U.S. Appl. No. 13/252,854, mailed Jun. 3, 2014.
Final Office Action for U.S. Appl. No. 13/252,857, mailed Jul. 25, 2014.
Office Action for U.S. Appl. No. 13/252,860, mailed Jan. 16, 2015.
First Office Action for Chinese Application No. 201210174345.X, mailed Dec. 1, 2014.
Rejection Decision for Chinese Application No. 201210174345.X, mailed Feb. 15, 2016.

* cited by examiner

| Policy Table 600 |||||
|---|---|---|---|---|
| User 610 | User IP Address 620 | Remote IP Address 630 | Direction 640 | Policy 650 |
| A | x.x.x.x | 192.168.120.101 | Down | Deny |
| B | 192.168.120.2 | 192.168.120.100 | Down | Allow |
| B | x.x.x.x | 192.168.120.200 | Up | Deny |
| C | 192.168.120.1 | 192.168.1.x | Down | Deny |
| C | x.x.x.x | 192.168.120.200 | Up | Allow |
| D | 192.168.x.x | 192.168.x.x | Bi | Restrict |
| E | 192.168.120.3 | 192.168.x.x | Bi | Restrict |

Up-Link Policy Table 701

| User 710 | User IP Address 720 | Remote IP Address 730 | Policy 740 |
|---|---|---|---|
| B | 192.168.120.2 | 192.168.120.200 | Deny |

Up-Link Policy Table 702

| User 710 | User IP Address 720 | Remote IP Address 730 | Policy 740 |
|---|---|---|---|
| C | 192.168.120.1 | 192.168.120.200 | Allow |
| E | 192.168.120.3 | 192.168.x.x | Restrict |

FIG. 7

METHODS AND APPARATUS FOR ENFORCING A COMMON USER POLICY WITHIN A NETWORK

CROSS-REFERENCE TO RELATED APPLICATIONS

This application is a continuation of U.S. patent application Ser. No. 13/252,856, filed Oct. 4, 2011, entitled "Methods and Apparatus for Enforcing a Common User Policy within a Network," which is related to co-pending U.S. patent application Ser. No. 13/252,852, filed Oct. 4, 2011, and entitled "Methods and Apparatus for a Converged Wired/Wireless Enterprise Network Architecture;" U.S. patent application Ser. No. 13/252,860, filed Oct. 4, 2011, and entitled "Methods and Apparatus for Centralized Management of Access and Aggregation network Infrastructure;" U.S. patent application Ser. No. 13/252,857, filed Oct. 4, 2011, and entitled "Methods and Apparatus for a Scalable Network with Efficient Link Utilization," U.S. patent application Ser. No. 13/252,854, filed Oct. 4, 2011, and entitled "Methods and Apparatus for a Self-organized Layer-2 Enterprise Network Architecture," each of which is incorporated herein by reference in its entirety.

BACKGROUND

Some embodiments described herein relate generally to enterprise networks, and, in particular, to methods and apparatus for enforcing a common user policy within an enterprise network architecture.

Some known enterprise networks use different types of authentication to provide access to data resources for a user depending on the location of the user, the type of the client device, and the access method of the user. In such a known enterprise network, policy management and enforcement is typically done in a distributed fashion such that user-specific access controls are spread throughout multiple layers of the network. As a result, user policies are configured independently at individual network elements across multiple layers of the network without much co-ordination. Such a distributed method of enforcing user policies, however, typically requires each individual network element to be manually configured in accordance with its physical connectivity to other elements in the network, which makes the work of a network administrator difficult and cumbersome. Moreover, user policy configuration and enforcement is typically implemented separately in the wireless portion and the wired portion of such an enterprise network, which adds another level of complexity to the job of the network administrator.

Accordingly, a need exists for an enterprise network that allows for a common policy infrastructure to provide access to information and services independent of a user's location, access method and client device being used, such that user policies can be configured at a central point of the network.

SUMMARY

In some embodiments, an apparatus includes a core network node configured to be operatively coupled to a set of wired network nodes and a set of wireless network nodes. The core network node is configured to receive, at a first time, a first data packet to be sent to a wired device operatively coupled to a wired network node from the set of wired network nodes. The core network node is configured to also receive, at a second time, a second data packet to be sent to a wireless device operatively coupled to a wireless network node from the set of wireless network nodes. Such a wireless network node can be, for example, coupled to a wired network node from the set of wired network nodes. The core network node is configured to apply a common policy to the first data packet and the second data packet based on an identifier of a user associated with both the wireless device and the wired device.

BRIEF DESCRIPTION OF THE DRAWINGS

FIG. 7 is a schematic illustration of two up-link policy tables implemented in two access devices, which define user up-link policies based on a combination of a user identifier, a user IP address, and a remote IP address, according to an embodiment.

DETAILED DESCRIPTION

Figure 1:
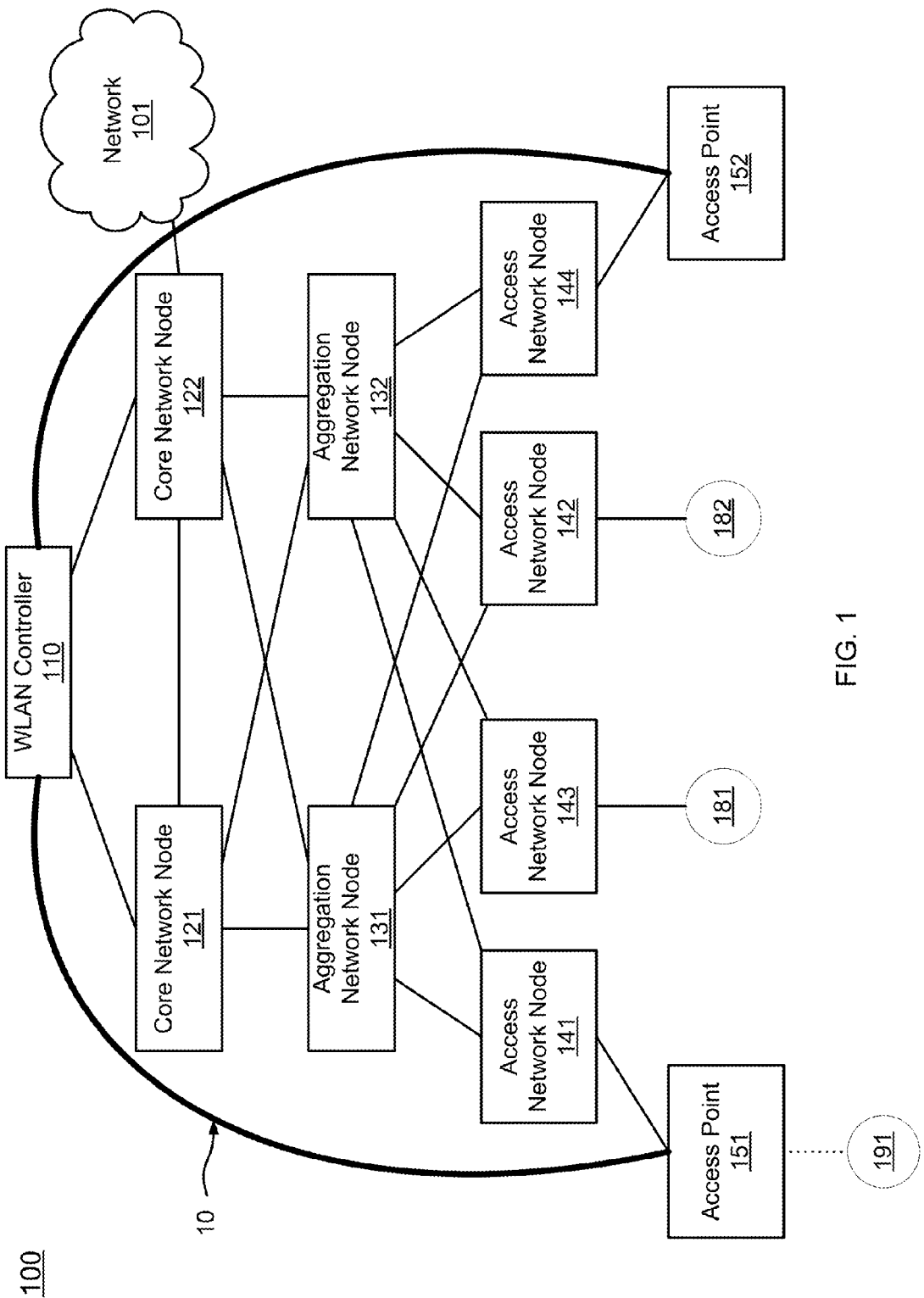
FIG. 1 is a schematic illustration of an overlay enterprise network having access points, access network nodes, aggregation network nodes, core network nodes, and a WLAN controller, which are configured to enforce user policies in the wireless and wired portion of the network separately.

In some embodiments, an enterprise network includes a core network node operatively coupled to a set of wired network nodes and a set of wireless network nodes. In some embodiments, a wired network node can be an access network node or an aggregation network node. In response to a user being operatively coupled to a first wired network node from the set of wired network nodes using a wired device operatively coupled to the first wired network node, the core network node is configured to send an up-link policy associated with the user to the first wired network node. Later, the core network node is configured to receive a first data packet to be sent to the wired device, and then apply a common policy to the first data packet based on an identifier of the user associated with the wired device. In some embodiments, the common policy can be a down-link policy. Furthermore, in response to receiving the first data packet, the core network node can be configured to send the first data packet to the first wired network node via a multiprotocol label switching (MPLS) tunnel through a second wired network node from the set of wired network nodes, where the second wired network node does not store the common policy. In some embodiments, the second wired network node is an aggregation network node from the set of wired network nodes. After the user is disconnected from the first wired network node, the core network node is configured to send an instruction to remove the up-link policy from the first wired network node.

Similarly, in response to the user being operatively coupled to a wireless network node from the set of wireless network nodes using a wireless device operatively coupled to the wireless network node, the core network node is configured to send the up-link policy associated with the user to the wireless network node. Later, the core network node is configured to receive a second data packet to be sent to the wireless device, and then apply the common policy to the second data packet based on the identifier of the user associated with the wireless device. In some embodiments, the common policy is a down-link policy. In some embodiments, the core network node includes a policy database that associates the common policy with the identifier of the user. In some embodiments, the wireless device and the wired device are a single device. In some other embodiments, the wireless device and the wired device are distinct devices.

In some embodiments, an enterprise network includes a wired network node and a wireless network node. The wired network node is configured to receive, from a core network node of the enterprise network, a policy associated with a user, based on the user being associated with a wired device operatively coupled to the wired network node when the user is associated with the wired device. In some embodiments, the wired network node is configured to receive the policy from the core network node via a MPLS tunnel through an aggregation network node operatively coupled to the wired network node. In some embodiments, the received policy is stored in a policy database included in the wired network node, where the policy database associates the policy with an identifier of the wired device when the user is associated with the wired device. In some embodiments, the policy is an up-link policy, and the wired network node is configured to apply the policy to a first data packet received from the wired device prior to sending the first data packet to the core network node. Later, the core network node is configured to apply a down-link policy associated with the user to a second data packet before sending the second data packet to the wired network node. A predetermined amount of time after the user is disassociated with the wired device, or the wired device is operatively decoupled from the wired network node, the wired network node is configured to remove the policy from the policy database at the wired network node.

Similarly, in response to a user being operatively coupled to the wireless network node using a wireless device operatively coupled to the wireless network node, the wireless network node is configured to send an initiation signal to the core network node. As a result, the wireless network node is configured to receive, from the core network node, the policy associated with the user, based on the user being associated with the wireless device. The wireless network node is further configured to apply the policy to a third data packet received from the wireless device prior to sending the third data packet to the core network node.

FIG. 1 is a schematic illustration of an overlay enterprise network 100 having access points (e.g., access point 151, access point 152), access network nodes (e.g., access network node 141-144), aggregation network nodes (e.g., aggregation network node 131, aggregation network node 132), core network nodes (e.g., core network node 121, core network node 122), and a WLAN (wireless local area network) controller 110, which are configured to enforce user policies in the wireless and wired portion of the overlay enterprise network 100 separately, according to an existing enterprise network architecture. Specifically, the core network nodes and the wired network nodes, including the access network nodes and the aggregation network nodes, are configured to enforce user policies for one or more users accessing the overlay enterprise network 100 through one or more wired devices (e.g., wired device 181, wired device 182) that are operatively coupled to one or more access network nodes (e.g., access network node 143, access network node 142). On the other hand, the WLAN controller 110 is configured to enforce user policies for one or more users accessing the overlay enterprise network 100 through one or more wireless devices (e.g., wireless device 191) that are operatively coupled to one or more wireless network nodes (e.g., access point 151, access point 152).

A core network node (e.g., core network node 121, core network node 122) can be a high-capacity switching device positioned in the physical core, or backbone, of an enterprise network (e.g., the overlay enterprise network 100). In some cases, a core network node is known as a core switch, a tandem switch or a backbone switch. In the overlay enterprise network 100, core network node 121 and core network node 122 are configured to connect the access devices (e.g., access network node 141-144, access point 151-152) and WLAN controller 110 with network 101, such that access to information services (e.g., persistent data and applications) located at network 101 can be provided to users that are coupled to the overlay enterprise network 100 via wired or wireless devices (e.g., wired device 181, wired device 182, wireless device 191). Specifically, core network node 121 and core network node 122 operatively connect aggregation network node 131 and aggregation network node 132 with network 101, and forward packets of wired and/or wireless sessions between aggregation network node 131, aggregation network node 132 and network 101 based on IP routing services. In other words, core network node 121 and core network node 122 act as a router working in layer 3 (i.e., network layer) of the OSI (open systems interconnection) model for the overlay enterprise network 100. In the overlay enterprise network 100, core network node 121 and core network node 122 are configured to manage wired sessions only, including enforcing user policies for users of wired sessions only. On the other hand, wireless sessions are managed by WLAN controller 110, including enforcing user policies for users of wireless sessions.

Shown in FIG. 1, network 101 can be any network that is directly connected to the overlay enterprise network 100 through one or more core network nodes. For example, network 101 can be a data center network including one or more data servers that provide information services. For another example, network 101 can be a WAN (wide area network) access network that is used to connect the overlay enterprise network 100 to remote data resources. For yet another example, network 101 can be the Internet. Typically, the overlay enterprise network 100 acts as an access network providing, for wired or wireless clients, access to data resources, applications, and information services that are located at or provided from network 101.

In the overlay enterprise network 100, the access network nodes (e.g., access network node 141-144) can be any device that can directly connect one or more wired devices (e.g., wired device 181, wired device 182) to the overlay enterprise network 100, such as a hub, an Ethernet switch, etc. In some cases, an access network node is known as an access switch, a network switch, or a switching hub. Furthermore, as described in detail herein, access network node 141-144 is configured to ensure packets are delivered between one or more aggregation network nodes, one or more wired devices, and/or one or more access points that are coupled to the access network nodes. In the overlay enterprise network 100, a wired device can be any device that can receive packets from and/or send packets to an access network node through a wired connection, such as a desktop computer, a workstation, a printer, etc.

In the overlay enterprise network 100, the aggregation network nodes (e.g., aggregation network node 131-132) can be any switching device that is used to aggregate multiple access network nodes and ensure packets are properly routed within the network, such as a router, a layer-3 switch, etc. Furthermore, as described in detail herein, aggregation network node 131-132 is configured to route packets received from one or more access network nodes to another access network node or a core network node, based on the routing information provided in the packet and the routing policy implemented at aggregation network node 131-132. In some scenarios, a collection of aggregation network nodes and associated access devices (e.g., access network nodes, access points) having a common connection to a redundant set of core network nodes are referred to as a pod. As shown in FIG. 1, aggregation network node 131-132 with their associated access network node 141-144 and access point 151-152 comprise a pod.

In the overlay enterprise network 100, core network node 121-122, aggregation network node 131-132, and access network node 141-144 are configured collectively to manage and forward wired traffic for one or more wired devices that are operatively coupled to one or more access network nodes. Wired network nodes including access network nodes 141-144 and aggregation network nodes 131-132 are configured to switch or route packets of a wired session that are received from a wired device, to another wired network node or a core network node, based on a destination address (e.g., a destination IP address, a destination MAC address) included in the packets. More specifically, some wired traffic that is received at an aggregation network node from an access network node may be switched to another access network node from the aggregation network node if the traffic is destined to a destination device within the same pod. In contrast, the wired traffic destined to a destination device located in another pod is forwarded to a core network node, from which the traffic is forwarded into the other pod. For example, if wired device 181 sends a packet to access network node 143 destined to wired device 182, the packet can be first forwarded by access network node 143 to aggregation network node 131. Then, based on the destination IP address or MAC address included in the packet, the packet is further forwarded by aggregation network node 131 to access network node 142, which finally sends the packet to wired device 182. For another example, if wired device 181 sends a packet to access network node 143 destined to a device located in network 101, the packet can be first forwarded by access network node 143 to aggregation network node 131. Then, based on the destination IP address or MAC address included in the packet, the packet is further forwarded by aggregation network node 131 to core network node 122, which sends the packet into network 101 for further routing.

In the overlay enterprise network 100, wireless equipment, including WLAN controller 110 and access points 151-152, forward wireless traffic that is received from one or more wireless devices (e.g., wireless device 191). Specifically, WLAN controller 110 can be any device that can automatically handle the configuration of multiple access points, and act as a centralized controller configured to manage wireless sessions in an overlay of the wired network portion of the overlay enterprise network 100. An access point can be any device that connects a wireless device to a wired network (e.g., via an access network node as shown in FIG. 1) using, for example, Wi-Fi, Bluetooth or other wireless communication standards. In some cases, an access point can be located on the same device together with an access network node, such as a wireless Ethernet router equipped with a wireless transceiver. In some other cases, an access point can be a stand-alone device, such as a wireless access point (WAP). Similar to a wired device, a wireless device can be any device that can receive packets from and/or send packets to an access point through a wireless connection, such as, for example, a mobile phone, a Wi-Fi enabled laptop, a Bluetooth earphone, etc.

In the overlay enterprise network 100, WLAN controller 110 and access points 151-152 are configured collectively to manage and forward wireless traffic through intervening wired network nodes and core network nodes. Specifically, WLAN controller 110 is configured to receive encapsulated packets of a wireless session from access point 151 or access point 152 via a layer-3 tunnel through intervening wired network nodes and core network nodes, decapsulate the packets, and then bridge the decapsulated packets to core network node 121 or core network node 122, from which the decapsulated packets are further forwarded to the destination. Similarly, WLAN controller 110 is configured to receive packets of the wireless session from core network node 121 or core network node 122 destined to access point 151 or access point 152, encapsulate the packets according to a layer-3 tunneling protocol, and then send the encapsulated packets to access point 151 or access point 152 via a layer-3 tunnel through intervening wired network nodes and core network nodes, where the encapsulated packets are decapsulated and forwarded to a wireless device. In some cases, a layer-3 tunnel can be an Ethernet over layer-3 tunnel, such as a CAPWAP (control and provisioning of wireless access points) tunnel, a GRE (generic routing encapsulation) tunnel, etc.

In the wired portion of the overlay enterprise network 100, the core network nodes and the wired network nodes, including the access network nodes and the aggregation network nodes, are configured to enforce user policies for users accessing the overlay enterprise network 100 through one or more wired devices that are operatively coupled to one or more access network nodes. Specifically, access control policies (e.g., to network resources, to specific IP addresses) for users accessing the overlay enterprise network 100 through wired devices are individually maintained, configured, and enforced at core network nodes and/or one or more wired network nodes of the overlay enterprise network 100, depending on the network configuration. In some cases, policy management and enforcement for the wired portion of the overlay enterprise network 100 is done in a distributed fashion without much co-ordination among the core network nodes and the wired network nodes. For example, an access control policy that controls a user transferring files from wired device 181 to a computer device in network 101 can be configured and enforced at access network node 143. For another example, another access control policy that restricts a user downloading video contents from a server in network 101 to wired device 182 can be configured and enforced at aggregation network node 131 and aggregation network node 132.

On the other hand, in the wireless portion of the overlay enterprise network 100, the WLAN controller 110 is configured to solely enforce user policies for users accessing the overlay enterprise network 100 through one or more wireless devices (e.g., wireless device 191) that are operatively coupled to one or more wireless network nodes (e.g., access point 151, access point 152). Specifically, access control policies for users accessing the overlay enterprise network 100 through wireless devices are maintained, configured, and enforced at WLAN controller 110. In other words, policy management and enforcement for the wireless portion of the overlay enterprise network 100 is done in a centralized fashion at WLAN controller 110, as all wireless traffic goes through WLAN controller 110 before it is forwarded to the destination. For example, access policies that control a user sending data packets from wireless device 191 to a computer device in network 101 and receiving data packets at wireless device 191 from that computer device in network 101 are both configured and enforced at WLAN controller 110.

As a result of lacking a centralized, common policy infrastructure in the overlay enterprise network 100, different user policies may be applied to provide access control to data resources for a user depending on the location of the user and/or the access method of the user. For example, access control policies can be enforced separately at WLAN controller 110 and aggregation network node 132 such that packets of a wireless session from a device in network 101 destined to a user using wireless device 191 cannot be forwarded by WLAN controller 110; while packets of a wired session from the same device in network 101 destined to the same user using wired device 182 can be forwarded by aggregation network node 132. Thus, the user cannot receive wireless traffic from that device in network 101 via wireless device 191, which is operatively coupled to access point 151, but can receive wired traffic from the same device in network 101 via wired device 182, which is operatively coupled to access network node 142.

For another example, access control policies can be enforced separately at access network node 142 and access network node 143 such that packets destined to a specific IP address in network 101 that are received at access network node 142 (e.g., from wired device 182) from a user cannot be forwarded by access network node 142; while packets destined to the same IP address that are received at access network node 143 (e.g., from wired device 181) from the same user can be forwarded by access network node 143. Thus, the user can send packets to an entity associated with that specific IP address in network 101 via wired device 181, which is operatively coupled to access network node 143, but cannot send packets to the entity associated with the same IP address via wired device 182, which is operatively coupled to access network node 142.

Figure 2:
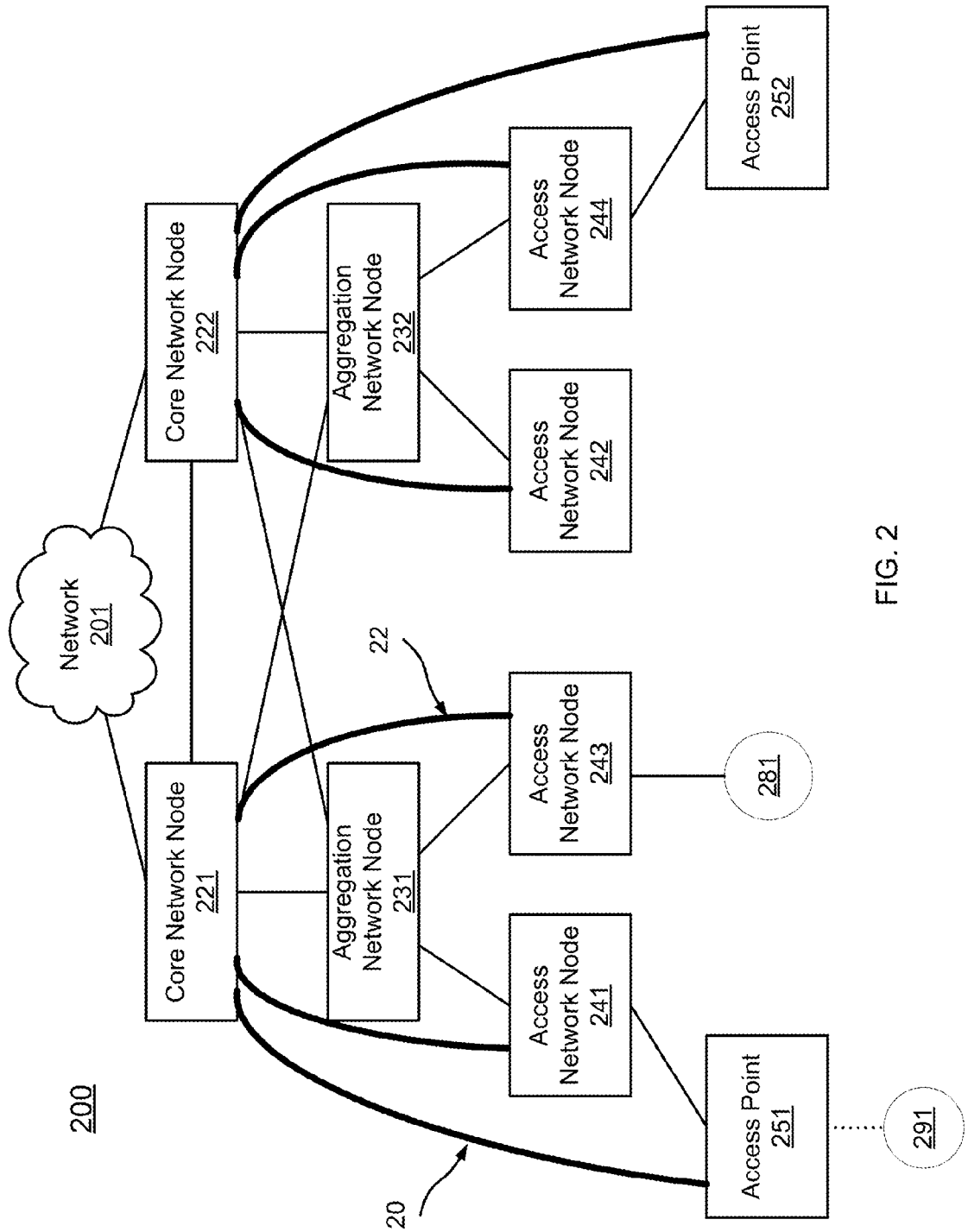
FIG. 2 is a schematic illustration of a homogeneous enterprise network having access points, access network nodes, aggregation network nodes, and core network nodes, which are configured collectively to implement a common user policy infrastructure, according to an embodiment.

FIG. 2 is a schematic illustration of a homogeneous enterprise network 200 having access points (e.g., access point 251, access point 252), access network nodes (e.g., access network node 241-244), aggregation network nodes (e.g., aggregation network node 231, aggregation network node 232), and core network nodes (e.g., core network node 221, core network node 222), which are configured collectively to implement a common user policy infrastructure, according to an embodiment. Specifically, the core network nodes and the access network nodes are configured collectively to enforce the common user policy for a user accessing the homogeneous enterprise network 200 through a wired device (e.g., wired device 281) that is operatively coupled to an access network node (e.g., access network node 243) of the homogeneous enterprise network 200. Similarly, the core network nodes and the access points are configured collectively to enforce the common user policy for the user accessing the homogeneous enterprise network 200 through a wireless device (e.g., wireless device 291) that is operatively coupled to an access point (e.g., access point 251) of the homogeneous enterprise network 200. In addition, similar to network 101 shown in FIG. 1, network 201 is a network coupled to the homogeneous enterprise network 200 through core network node 221 and/or core network node 222, which provides access to data resources, applications, and/or information services, to clients that are operatively coupled to the homogeneous enterprise network 200. For example, network 201 can be a data center network, a WAN, the Internet, etc.

In an enterprise network, if every network device included in the enterprise network or a portion of the enterprise network can be controlled by one or more core network nodes, then that enterprise network can be referred to as a homogeneous enterprise network, or that portion of the enterprise network can be referred to as a homogeneous portion of the enterprise network. In such a homogeneous network or portion of the network it is possible to use MPLS tunneling technology to tunnel traffic (e.g., wired or wireless traffic). If not every network node included in a portion of the enterprise network can be controlled by one or more core network nodes, then that portion of the enterprise network is referred to as an overlay enterprise network portion. In some embodiments, one or more network devices included in a homogeneous portion or an overlay enterprise network portion of an enterprise network can tunnel traffic using a layer-3 tunneling technology (e.g., CAPWAP, Ethernet-in-GRE). MPLS tunneling technology can be used only in the homogeneous portion. Furthermore, in a homogeneous enterprise network or a homogeneous portion of an enterprise network, a common tunneling technology (e.g., MPLS, a layer-3 tunneling technology) can be used to forward both the wired traffic and the wireless traffic. More detail related to the tunneling technologies used to forward wired and/or wireless traffic in an enterprise network is set forth in co-pending U.S. patent application Ser. No. 13/252,852, filed Oct. 4, 2011, entitled, "Methods and Apparatus for a Converged Wired/Wireless Enterprise Network Architecture," which is incorporated herein by reference in its entirety.

Figures 5, 6:
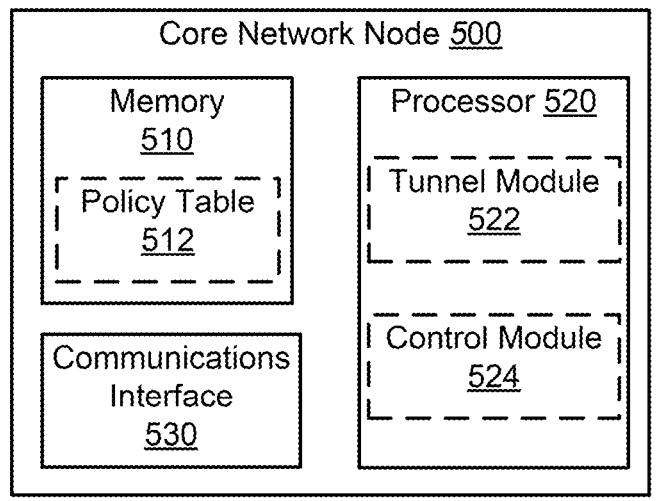
FIG. 5 is a system block diagram of a core network node, according to an embodiment.
FIG. 6 is a schematic illustration of a policy table implemented in a core network node, which defines user policies based on a combination of a user identifier, a user IP address, a remote IP address, and a direction identifier, according to an embodiment.

A core network node in a homogeneous enterprise network (e.g., core network node 221 or core network node 222 in the homogeneous enterprise network 200) can be, for example, upgraded from a core network node in an overlay enterprise network (e.g., core network node 121 or core network node 122 in the overlay enterprise network 100). In such an upgrade, the core network node in a homogeneous enterprise network (e.g., core network node 221, core network node 222) is a single device that combines a switch, a router, and a controller, which includes a control module (e.g., control module 524 for core network node 500 as shown in FIG. 5) configured to manage wired/wireless network nodes and/or wired/wireless user sessions. In other words, core network node 221, 222 is a consolidation of at least a WLAN controller (e.g., WLAN controller 110) and a core network node from an overlay enterprise network. On one hand, similar to a core network node from an overlay enterprise network, core network node 221, 222 is still able to forward packets of wired sessions between an aggregation network node and a network that is operatively coupled to core network node 221, 222. On the other hand, unlike a core network node within an overlay enterprise network, core network node 221, 222 can establish a wired session with an access network node, or establish a wireless session with an access point, through intervening wired network nodes, via a tunnel (e.g., a MPLS tunnel, a layer-3 tunnel). In some embodiments, a core network node in a homogeneous enterprise network is referred to as a core SRC (switch, router, and controller).

Similar to core network nodes 221-222, all other devices in the homogeneous enterprise network 200, including aggregation network node 231-232, access network node 241-244, and access point 251-252, can be configured to operate in a homogeneous enterprise network. Specifically, the functionality of access network node 241-244 and aggregation network node 231-232 includes multiplexing client traffic, including packets of wired and wireless sessions, to core network node 221 or core network node 222 without any need for local switching or complex forwarding and classification functionality. For example, unlike aggregation network nodes 131-132 in the overlay enterprise network 100, aggregation network node 231 does not need to be configured to switch or route a packet received from access network node 243 to another access network node based on a destination address included in the packet. Instead, aggregation network node 231 can be configured to forward the packet, through a portion of a tunnel between access network node 243 and core network node 221 (shown as the tunnel represented by 22 in FIG. 2), to core network node 221, from which the packet is further switched or routed to the destination. Similarly stated, access network nodes 241-244 are configured to transmit wired traffic to core network node 221 or core network node 222 via a tunnel (e.g., the tunnel represented by 22 in FIG. 2) through intervening aggregation network nodes 231-232. Access points 251-252 are configured to transmit wireless traffic to core network node 221 or core network node 222 via a tunnel (e.g., a tunnel represented by 20 in FIG. 2) through intervening access network nodes and aggregation network nodes.

In an enterprise network, the tunneling technology applied between a core network node and an access device (e.g., an access network node, an access point) depends on the nature and/or capabilities of the core network node, the access device, and the intermediate network device(s) (e.g., aggregation network node) present between the core network node and the access device. Particularly, in a homogeneous enterprise network (e.g., homogeneous enterprise network 200), a tunneling protocol such as MPLS or a layer-3 tunneling protocol can be used to forward the wired traffic and/or the wireless traffic.

For example, if wireless device 291 sends a packet to access point 251 destined to wired device 281, the packet is first encapsulated according to MPLS or a layer-3 tunneling protocol (e.g., CAPWAP, Ethernet-in-GRE) at access point 251, and then transmitted to core network node 221 via a MPLS tunnel or a layer-3 tunnel through access network node 241 and aggregation network node 231 (shown as the tunnel represented by 20 in FIG. 2). Next, the encapsulated packet is decapsulated according to MPLS or the layer-3 tunneling protocol at core network node 221. Then based on a destination IP address or a destination MAC address included in the packet, the packet is encapsulated again according to MPLS or a layer-3 tunneling protocol at core network node 221, and the encapsulated packet is forwarded by core network node 221 to access network node 243 via another MPLS tunnel or another layer-3 tunnel through aggregation network node 231 (shown as the tunnel represented by 22 in FIG. 2). Finally, the encapsulated packet is decapsulated according to MPLS or the layer-3 tunneling protocol at access network node 243, from which the decapsulated packet is delivered to wired device 281.

For another example, if wired device 281 sends a packet to access network node 243 destined to an IP address located in network 201, the packet is first encapsulated according to MPLS or a layer-3 tunneling protocol at access network node 243, and then transmitted to core network node 221 via a MPLS tunnel or a layer-3 tunnel through aggregation network node 231 (shown as the tunnel represented by 22 in FIG. 2). Next, the encapsulated packet is decapsulated according to MPLS or the layer-3 tunneling protocol at core network node 221. Finally, based on a destination IP address included in the packet, the decapsulated packet is forwarded by core network node 221 to network 201, and further delivered to the destination entity associated with the destination IP address in network 201.

In the homogeneous enterprise network 200, unlike in the overlay enterprise network 100, wired network nodes and wireless network nodes are no longer individually configured and managed. In particular, the access control policy for a given user (e.g., to network resources, to specific IP addresses) is no longer individually maintained, configured, and enforced at each aggregation network node, access network node, access point, or a WLAN controller. Instead, a common user policy for a given user is maintained and configured at one or more core network nodes, and applied automatically by the enterprise network at an access network node or an access point as needed, depending on where and how the user connects to the network. More specifically, down-link policy enforcement can be centralized at core network nodes, where for example, a complete view of all user traffic is available for monitoring and policing. In contrast, most up-link policies can be downloaded to and enforced at access devices (e.g., access network nodes, access points) to avoid wasting bandwidth in the enterprise network. Particularly, the access device is an access network node if the user accesses the homogeneous enterprise network 200 through a wired device, and the access device is an access point if the user accesses the homogeneous enterprise network 200 through a wireless device.

For example, as shown in FIG. 2, a common user policy for a user is maintained and configured at core network nodes 221-222 of the homogeneous enterprise network 200. Specifically, down-link policies for all users that are connected or potentially connected to the homogeneous enterprise network 200, including users accessing through wireless device 291 and wired device 281, are maintained in a policy table stored in core network node 221 and/or core network node 222, and enforced at the core network nodes. On the other hand, up-link policies for users accessing the homogeneous enterprise network 200 through wireless device 291 and wired device 281 are downloaded to and enforced at access point 251 and access network node 243, respectively, after the users are connected to the access devices. Further details on down-link policies, up-link policies, and policy tables are described with respect to FIGS. 6-7.

In some embodiments, maintaining and configuring a common user policy at one or more core network nodes of a homogeneous enterprise network enables a user policy, including an up-link policy and a down-link policy, to be enforced solely dependent on the user, regardless of the access method (e.g., via a wired connection, via a wireless connection) adopted by the user. In other words, the same user policy is applied to a user when the user accesses the homogeneous enterprise network through different access devices (e.g., an access point, an access network node) and/or via different types of connections (e.g., a wired connection, a wireless connection). In some embodiments, a user can be identified by a homogeneous enterprise network using a unique combination of a user ID and a password. For example, as shown in FIG. 2, a user using wireless device 291 accesses access point 251 by providing a combination of a user ID and a password, and then is engaged in a wireless session at a first time. As a result, an up-link policy for the user is applied at access point 251 and a down-link policy for the user is applied at core network node 221. Note that access network node 241 and aggregation network node 231 need not have the up-link policy for the user because access point 251 tunnels through access network node 241 and aggregation network node 231 to reach core network node 221. At a second time, the same user using wired device 281 accesses access network node 243 by providing the same combination of the user ID and the password, and then is engaged in a wired session. As a result, again, the same up-link policy for the user is applied at access network node 243 and the same down-link policy for the user is applied at core network node 221. Note that aggregation network node 231 need not have the up-link policy for the user because access network node 243 tunnels through aggregation network node 231 to reach core network node 221.

In some embodiments, a common user policy can be enforced solely dependent on the user communication device (e.g., a wired device, a wireless device) used by a user, regardless of the access method adopted by the user. In other words, the same user policy can be applied to a user communication device when the user communication device is connected to the homogeneous enterprise network through different access devices and/or via different types of connections. In some embodiments, a user communication device can be identified by a homogeneous enterprise network using a unique identifier associated with the user communication device, such as a MAC address. For example, as shown in FIG. 2, a user communication device (e.g., a Wi-Fi enabled laptop) is connected to access point 251 and recognized by its MAC address, and then is engaged in a wireless session at a first time. As a result, an up-link policy for the user communication device is applied at access point 251 and a down-link policy for the user communication device is applied at core network node 221. At a second time, the same user communication device is connected to access network node 243 and recognized by its MAC address again, and then is engaged in a wired session. As a result, again, the same up-link policy for the user communication device is applied at access network node 243 and the same down-link policy for the user communication device is applied at core network node 221.

In some embodiments, a centralized core architecture can provide a single point of configuration and management for services within the enterprise network as well as a single logic node of interaction for visibility and monitoring applications. As a result, various types of service modules can be aggregated and/or consolidated at one or more core network nodes, such as firewall, intrusion detection policy (IDP), virtual private network (VPN) termination, load balancing, etc. In such a homogeneous enterprise network, services no longer need to be distributed at various levels in the network, and users can be given consistent policy that is independent of their access mechanism, as described in detail above.

Figure 3:
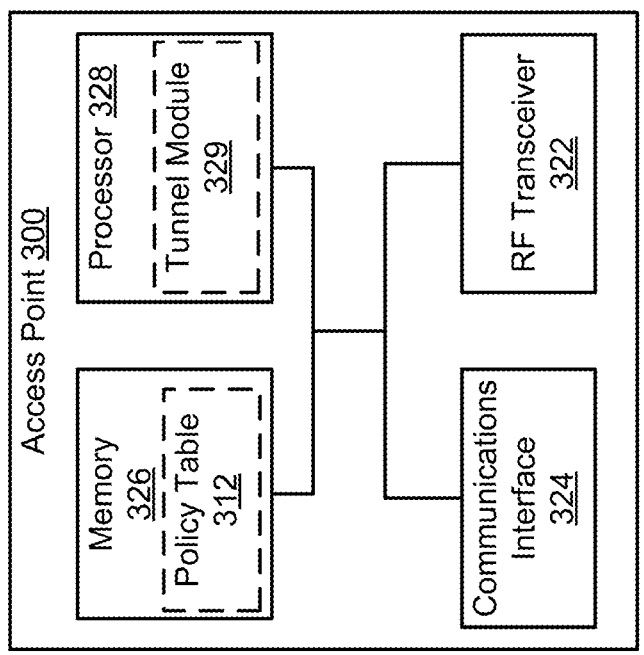
FIG. 3 is a system block diagram of an access point, according to an embodiment.

FIG. 3 is a system block diagram of an access point 300, according to an embodiment. Similar to access point 251 and access point 252 in the homogeneous enterprise network 200 shown in FIG. 2, access point 300 can be any device that connects one or more wireless devices to a homogeneous enterprise network (e.g., via an access network node) using for example, Wi-Fi, Bluetooth or other wireless communication standards. For example, access point 300 can be a wireless access point (WAP). As shown in FIG. 3, access point 300 includes RF transceiver 322; communications interface 324; memory 326, which contains policy table 312; and processor 328, which contains tunnel module 329. Each component of access point 300 is operatively coupled to each of the remaining components of access point 300. Furthermore, each operation of RF transceiver 322 (e.g., transmit/receive data), communications interface 324 (e.g., transmit/receive data), tunnel module 329 (e.g., encapsulate/decapsulate packets), as well as each manipulation on policy table 312 (e.g., download/update/remove an up-link policy) or any other portion of memory 326, are controlled by processor 328.

In some embodiments, access point 300 can communicate with a wireless device (e.g., a Wi-Fi enabled laptop, a mobile phone) using any suitable wireless communication standard such as, for example, Wi-Fi, Bluetooth, and/or the like. Specifically, access point 300 can be configured to receive data and/or send data through RF transceiver 322, when communicating with a wireless device. Furthermore, in some embodiments, an access point of an enterprise network uses one wireless communication standard to wirelessly communicate with a wireless device operatively coupled to the access point; while another access point of the enterprise network uses a different wireless communication standard to wirelessly communicate with a wireless device operatively coupled to the other access point. For example, as shown in FIG. 2, access point 251 can receive data packets through its RF transceiver from wireless device 291 (e.g., a Wi-Fi enabled laptop) based on the Wi-Fi standard; while access point 252 can send data packets from its RF transceiver to another wireless device (e.g., a Bluetooth-enabled mobile phone) (not shown in FIG. 2) based on the Bluetooth standard.

In some embodiments, access point 300 can be operatively coupled to an access network node by implementing a wired connection between communications interface 324 and the counterpart (e.g., a communications interface) of the access network node. The wired connection can be, for example, twisted-pair electrical signaling via electrical cables, fiber-optic signaling via fiber-optic cables, and/or the like. As such, access point 300 can be configured to receive data and/or send data through communications interface 324, which is connected with the communications interface of an access network node, when access point 300 is communicating with the access network node. Furthermore, in some embodiments, an access point of an enterprise network implements a wired connection with an access network node operatively coupled to the access point; while another access point of the enterprise network implements a different wired connection with an access network node operatively coupled to the other access point. For example, as shown in FIG. 2, access point 251 can implement one wired connection such as twisted-pair electrical signaling to connect with access network node 241; while access point 252 can implement a different wired connection such as fiber-optic signaling to connect with access network node 244.

In some embodiments, as described with respect to FIG. 2, access point 300 can be configured to prepare a packet (e.g., a data packet, a control packet) received from a wireless device operatively coupled to access point 300, and send the packet to another network device such as a core network node via a tunnel (e.g., a layer-3 tunnel, a MPLS tunnel). Access point 300 can also be configured to decapsulate a packet received via a tunnel from another network device such as a core network node, before forwarding the decapsulated packet to a wireless device operatively coupled to access point 300. Specifically, upon receiving a packet from a wireless device operatively coupled to access point 300, tunnel module 329 is configured to encapsulate the packet (e.g., add a header portion, a footer portion, and/or modify any other identifiers included within the packet) according to a predetermined tunneling protocol (e.g., a layer-3 tunneling protocol, MPLS). The encapsulated packet is then sent through communications interface 324 to an access network node connected to access point 300, from which the encapsulated packet is forwarded along the tunnel to a network device at the end of the tunnel. On the other hand, upon receiving a packet from an access network node connected to access point 300 that is sent through a tunnel from a network device, tunnel module 329 is configured to decapsulate the packet (e.g., remove a header portion, a footer portion, and/or modify any other identifiers included within the packet) according to a predetermined tunneling protocol (e.g., the layer-3 tunneling protocol, MPLS). The decapsulated packet is then sent by RF transceiver 322 to a wireless device operatively coupled to access point 300.

In some embodiments, as described with respect to FIG. 2, access point 300 can be configured to receive and implement an up-link policy for a user accessing a homogeneous enterprise network through a wireless device operatively coupled to access point 300. Specifically, after a wireless device associated with a user is operatively coupled to access point 300, access point 300 can be configured to send an initiation signal to a core network node operatively coupled to access point 300, notifying the core network node that the user is connected to access point 300 via the wireless device. In response to the initiation signal received at the core network node, an up-link policy associated with the user is downloaded from the core network node to access point 300, and stored in policy table 312 in memory 326 of access network node 300. Similar to transmitting data packets between the core network node and access point 300, the up-link policy can be sent from the core network node to access point 300 via a MPLS tunnel or a layer-3 tunnel through one or more intervening wired network nodes, such as an access network node and/or an aggregation network node to which the core network node and access point 300 are operatively coupled. Particularly, the up-link policy is not stored at any of the intervening wired network nodes. With the up-link policy downloaded to policy table 312, processor 328 of access network node 300 is configured to apply the up-link policy stored in policy table 312 to control forwarding packets received from the wireless device. Specifically, processor 328 is configured to forward packets received from the wireless device to the wired network node (e.g., an access network node) connected to access point 300, if such a forwarding is allowed by the up-link policy associated with the user, or drop the packets if such a forwarding is denied by the up-link policy associated with the user.

In some embodiments, access point 300 can be configured to remove an up-link policy associated with a user from policy table 312 after the user is disassociated with access point 300. A user can be disassociated with access point 300 in various manners. For example, a user is disassociated with access point 300 when the user is disassociated with the wireless device operatively coupled to access point 300, such as the user logs off from the wireless device. For another example, a user is disassociated with access point 300 after the wireless device associated with the user is operatively decoupled from access point 300. In some embodiments, access point 300 can be configured to automatically remove an up-link policy associated with a user from policy table 312, for example, a predetermined amount of time after the user is disassociated with access point 300. In some other embodiments, access point 300 can be configured to remove an up-link policy associated with a user from policy table 312 based on an instruction signal received from a core network node operatively coupled to access point 300.

For example, after a user is disassociated with access point 300, access point 300 can be configured to send a signal to the core network node from which access point 300 downloaded the up-link policy associated with the user, indicating the disassociation of the user from access point 300. The core network node can then send an instruction signal to access point 300, instructing access point 300 to remove the up-link policy associated with the user from its memory. For another example, after a core network node can be notified by a different access device (e.g., an access network node, an access point) that a user is operatively coupled to that access device, the core network node can send an instruction to access point 300, instructing access point 300 to remove the up-link policy associated with the user from its memory. In other words, if the user is operatively coupled to a different access device, then the user is no longer operatively coupled to access point 300. As a result of receiving an instruction signal from the core network node, access point 300 can be configured to remove the up-link policy associated with the user from policy table 312 in memory 326.

In some embodiments, memory 326 can be, for example, a random-access memory (RAM) (e.g., a dynamic RAM, a static RAM), a flash memory, a removable memory, and/or so forth. In some embodiments, data other than up-link policies stored in policy table 312 that is related to operations of access point 300 can also be stored in other portion of memory 326. For example, MAC addresses of potential user communication devices can be stored in memory 326, such that a user communication device can be recognized by access point 300 upon being operatively coupled to access point 300. For another example, information associated with tunneling packets to a core network node can be stored in memory 326, such that establishing a tunnel such as a MPLS tunnel or a layer-3 tunnel with the core network node can be initialized by access point 300.

Figure 4:
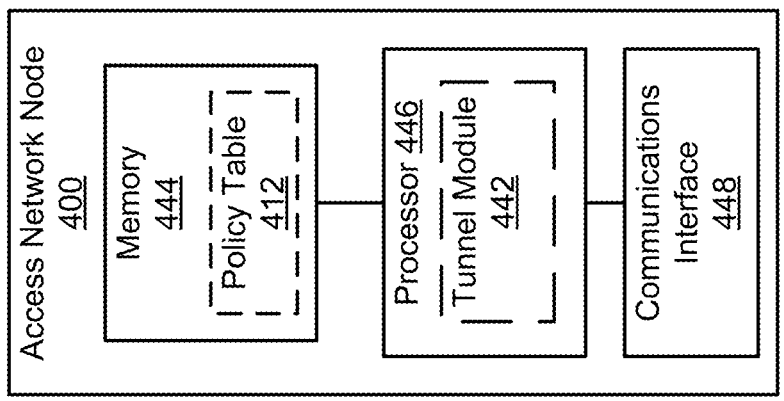
FIG. 4 is a system block diagram of an access network node, according to an embodiment.

FIG. 4 is a system block diagram of an access network node 400, according to an embodiment. Similar to access network node 241-244 in the homogeneous enterprise network 200 shown in FIG. 2, access network node 400 can be any device that connects one or more wired devices to a homogeneous enterprise network, such as a hub, an Ethernet switch, etc. More specifically, access network node 400 is configured to ensure packets are transmitted between one or more aggregation network nodes, wired devices, and/or access points that are operatively coupled to access network node 400. As shown in FIG. 4, access network node 400 includes communications interface 448; memory 444, which contains policy table 412; and processor 446, which contains tunnel module 442. Each component of access network node 400 is operatively coupled to each of the remaining components of access network node 400. Furthermore, each operation of communications interface 448 (e.g., transmit/receive data), tunnel module 442 (e.g., encapsulate/decapsulate packets), as well as each manipulation on policy table 412 (e.g., download/remove an up-link policy) or any other portion of memory 444, are controlled by processor 446.

In some embodiments, communications interface 448 of access network node 400 includes at least two ports (not shown in FIG. 4) that can be used to implement one or more wired connections between access network node 400 and one or more access points, wired devices, and/or aggregation network nodes. The wired connection can be, for example, twisted-pair electrical signaling via electrical cables, fiber-optic signaling via fiber-optic cables, and/or the like. As such, access network node 400 can be configured to receive data and/or send data through one or more ports of communications interface 448, which are connected to the communications interfaces of one or more access points, wired devices, and/or aggregation network nodes.

Furthermore, in some embodiments, access network node 400 can implement a wired connection with one of an access point, a wired device, or an aggregation network node that is operatively coupled to access network node 400 through one port of communications interface 448, while implementing a different wired connection with another access point, wired device, or aggregation network node that is operatively coupled to access network node 400 through another port of communications interface 448. For example, as shown in FIG. 2, access network node 241 can implement one wired connection such as twisted-pair electrical signaling to connect with access point 251, while implementing a different wired connection such as fiber-optic signaling to connect with aggregation network node 231.

In some embodiments, as described with respect to FIG. 2 and FIG. 3, access network node 400 can be one of the intervening wired network nodes between an access point and a core network node, through which a tunnel (e.g., a MPLS tunnel, a layer-3 tunnel) is established between the access point and the core network node. In such embodiments, access network node 400 can be configured to forward a tunneled packet (e.g., a packet encapsulated according to a layer-3 tunneling protocol or MPLS), which is received from one end of the tunnel and sent to the other end of the tunnel. For example, as shown in FIG. 2, access network node 241 can forward a tunneled packet encapsulated according to a layer-3 tunneling protocol or MPLS, which is received from access point 251, to aggregation network node 231 along the layer-3 tunnel or the MPLS tunnel (shown as the tunnel represented by 20 in FIG. 2) between access point 251 and core network node 221.

In some embodiments, as described with respect to FIG. 2, access network node 400 can be configured to prepare a packet (e.g., a data packet, a control packet) received from a wired device operatively coupled to access network node 400, and send the packet to another network device such as a core network node via a layer-3 tunnel or a MPLS tunnel. Access network node 400 can also be configured to decapsulate a packet received via a layer-3 tunnel or a MPLS tunnel from another network device such as a core network node, before forwarding the decapsulated packet to a wired device operatively coupled to access network node 400. Specifically, upon receiving a packet from a wired device operatively coupled to access network node 400, tunnel module 442 is configured to encapsulate the packet (e.g., add a header portion, a footer portion, and/or modify any other identifiers included within the packet) according to a layer-3 tunneling protocol or MPLS. The encapsulated packet is then sent through a port of communications interface 448 to an aggregation network node connected to access network node 400, from which the encapsulated packet is forwarded along the layer-3 tunnel or the MPLS tunnel to a core network node. On the other hand, upon receiving a packet from an aggregation network node connected to access network node 400 that is sent through a layer-3 tunnel or a MPLS tunnel from a core network node, tunnel module 442 is configured to decapsulate the packet (e.g., remove a header portion, a footer portion, and/or modify any other identifiers included within the packet) according to the layer-3 tunneling protocol or MPLS. The decapsulated packet is then sent through a port of communications interface 448 to a wired device operatively coupled to access network node 400.

In some embodiments, as described with respect to FIG. 2, access network node 400 can be configured to receive and implement an up-link policy for a user accessing a homogeneous enterprise network via a wired device operatively coupled to access network node 400. Specifically, after a wired device associated with a user is operatively coupled to access network node 400, access network node 400 can be configured to send an initiation signal to a core network node operatively coupled to access network node 400, notifying the core network node that the user is connected to access network node 400 via the wired device. In response to the initiation signal received at the core network node, an up-link policy associated with the user is downloaded from the core network node to access network node 400, and stored in policy table 412 in memory 444. Similar to transmitting data packets between the core network node and access network node 400, the up-link policy can be sent from the core network node to access network node 400 via a layer-3 tunnel or a MPLS tunnel through one or more intervening wired network nodes, such as an aggregation network node to which the core network node and access network node 400 are operatively coupled. Particularly, the up-link policy is not stored in any of the intervening wired network nodes. With the up-link policy downloaded to policy table 412, processor 446 of access network node 400 is configured to apply the up-link policy stored in policy table 412 to control forwarding packets received from the wired device. Specifically, processor 446 is configured to forward packets received from the wired device to the wired network node (e.g., an aggregation network node) connected to access network node 400, if such a forwarding is allowed by the up-link policy associated with the user, or drop the packets if such a forwarding is denied by the up-link policy associated with the user.

In some embodiments, access network node 400 can be configured to remove an up-link policy associated with a user from policy table 412 after the user is disassociated with access network node 400. A user can be disassociated with access network node 400 in various manners. For example, a user is disassociated with access network node 400 when the user is disassociated with the wired device operatively coupled to access network node 400, such as the user logs off from the wired device. For another example, a user is disassociated with access network node 400 after the wired device associated with the user is operatively decoupled from access network node 400. In some embodiments, access network node 400 can be configured to automatically remove an up-link policy associated with a user from policy table 412, for example, a predetermined amount of time after the user is disassociated with access network node 400. In some other embodiments, access network node 400 can be configured to remove an up-link policy associated with a user from policy table 412 based on an instruction signal received from a core network node operatively coupled to access network node 400.

For example, after a user is disassociated with access network node 400, access network node 400 can be configured to send a signal to the core network node from which access network node 400 downloaded the up-link policy associated with the user, indicating the disassociation of the user from access network node 400. The core network node can then send an instruction signal to access network node 400, instructing access network node 400 to remove the up-link policy associated with the user from its memory. For another example, after a core network node can be notified by a different access device (e.g., an access network node, an access point) that a user is operatively coupled to that access device, the core network node can send an instruction to access network node 400, instructing access network node 400 to remove the up-link policy associated with the user from its memory. In other words, if the user is operatively coupled to a different access device, then the user is no longer operatively coupled to access network node 400. As a result of receiving an instruction signal from the core network node, access network node 400 can be configured to remove the up-link policy associated with the user from policy table 412 in memory 444.

In some embodiments, memory 444 can be, for example, a random-access memory (RAM) (e.g., a dynamic RAM, a static RAM), a flash memory, a removable memory, and/or so forth. In some embodiments, data other than up-link policies stored in policy table 412 that is related to operations of access network node 400 can also be stored in other portion of memory 444. For example, MAC addresses of potential user communication devices can be stored in memory 444, such that a user communication device can be recognized by access network node 400 upon being operatively coupled to access network node 400. For another example, information associated with tunneling packets to a core network node can be stored in memory 444, such that establishing a MPLS tunnel or a layer-3 tunnel with the core network node can be initialized by access network node 400.

FIG. 5 is a system block diagram of a core network node 500, according to an embodiment. Similar to core network node 221 and core network node 222 in the homogeneous enterprise network 200 shown in FIG. 2, core network node 500 can be any switching device positioned in the physical core, or backbone, of an enterprise network, which is configured to operatively couple the remaining devices (e.g., aggregation network nodes, access network nodes, access points) of the enterprise network to one or more other networks that provide access to data resources and/or information services. More specifically, core network node 500 is configured, for example, to forward data between one or more aggregation network nodes and one or more other networks that are operatively coupled to core network node 500, based on IP routing services. Furthermore, core network node 500 is configured, for example, to manage both wired and wireless network devices, manage user sessions for both wired and wireless clients, maintain a policy table containing user policies (e.g., up-link policies, down-link policies) for wired and wireless clients and/or wired and wireless devices, and apply user policies to forward or drop packets for one or more users and/or for one or more user communication devices, as described in detail below.

As shown in FIG. 5, core network node 500 includes communications interface 530; memory 510, which contains policy table 512; and processor 520, which contains tunnel module 522 and control module 524. Each operation of communications interface 530 (e.g., transmit/receive data), tunnel module 522 (e.g., encapsulate/decapsulate packets), and control module 524 (e.g., manage a user session), as well as each manipulation on policy table 512 (e.g., modify an entry) or any other portion of memory 510, are controlled by processor 520.

In some embodiments, communications interface 530 of core network node 500 includes at least two ports (not shown in FIG. 5) that can be used to implement one or more wired connections between core network node 500 and one or more aggregation network nodes, other core network nodes, and/or devices of other networks. The wired connections can be, for example, twisted-pair electrical signaling via electrical cables, fiber-optic signaling via fiber-optic cables, and/or the like. As such, core network node 500 can be configured to receive data and/or send data through one or more ports of communications interface 530, which are connected with the communications interfaces of one or more aggregation network nodes, other core network nodes, and/or devices of other networks.

Furthermore, in some embodiments, core network node 500 can implement a wired connection with one of an aggregation network node, another core network node, or a device of another network that is operatively coupled to core network node 500 through one port of communications interface 530, while implementing a different wired connection with another aggregation network node, core network node, or device of another network that is operatively coupled to core network node 500 through another port of communications interface 530. For example, as shown in FIG. 2, core network node 221 can implement one wired connection such as twisted-pair electrical signaling to connect with aggregation network node 231, aggregation 232 and core network node 222, while implementing a different wired connection such as fiber-optic signaling to connect with a device of network 201.

In some embodiments, as described with respect to FIG. 2, core network node 500 can be configured to prepare a packet (e.g., a data packet, a control packet) to be sent to an access device (e.g., an access point, an access network node) via a tunnel (e.g., a tunnel according to a layer-3 tunneling protocol or MPLS). Core network node 500 can also be configured to receive and decapsulate an encapsulated packet from an access device via a tunnel. Similar to core network nodes in overlay enterprise network 100 shown in FIG. 1, core network node 500 can be configured to forward packets to and/or receive packets from other network devices that are operatively coupled to core network node 500, including other core network nodes and/or devices in other networks, without using any tunneling technology. Additionally, core network node 500 can be configured to forward or drop packets of a user session based on a user policy associated with the user that is stored in policy table 512. Particularly, control module 524 of core network node 500 is configured to manage both wired and wireless user sessions, and apply user policies to forward or drop packets for one or more users and/or for one or more user communication devices.

More specifically, upon receiving a packet associated with a user session at a port of communications interface 530 via a tunnel, tunnel module 522 is configured to decapsulate the packet (e.g., remove a header portion, a footer portion, and/or modify any other identifiers included within the packet) according to the protocol for that tunnel. Alternatively, core network node 500 can receive a packet associated with a user session at a port of communications interface 530 from another network device operatively coupled to core network node 500, such as another core network node or a device in another network. Control module 524 is then configured to apply a user policy associated with the user, which is stored in policy table 512, on the received packet. If the user session is allowed by the user policy, control module 524 is configured to forward the packet. If the user session is denied by the user policy, control module 524 is configured to drop the packet. If the user session is identified by the user policy as being restricted or otherwise affected by the user policy, control module 524 is configured to retrieve more information associated with the packet and/or the user session to make a decision.

To forward the received packet, control module 524 is configured to check the destination IP address or the destination MAC address included in the packet. If the packet is not destined to a user in a pod that is directly connected to core network node 500 (e.g., destined to a network device in a pod that is not connected to core network node 500, destined to a user in another network), control module 524 is configured to forward the packet, from a port of communications interface 530, to a network device that is operatively coupled to core network node 500. For example, control module 524 can be configured to forward the packet to another core network node operatively coupled to core network node 500 via a tunnel between the two core network nodes. For another example, control module 524 can be configured to forward the packet to a network device in another network operatively coupled to core network node 500 without using any tunneling technology. If the packet is destined to a user in a pod that is directly connected to core network node 500, tunnel module 522 is configured to encapsulate the packet (e.g., add a header portion, a footer portion, and/or modify any other identifiers included within the packet) according to the protocol for the tunnel. Meanwhile, control module 524 is configured to establish a tunnel connecting core network node 500 to the access device (e.g., an access network node, an access point) that is operatively coupled to the user communication device (if such a tunnel is not established yet). Finally, control module 524 is configured to send the encapsulated packet, from a port of communications interface 530, to the access device through the tunnel.

As described with respect to FIG. 2 and shown in FIG. 5, a common user policy (e.g., a down-link policy, an up-link policy) for a user is stored in policy table 512, which is maintained and configured at core network node 500. Policy table 512 is located within a portion of memory 510. In some embodiments, memory 510 can be, for example, a random-access memory (RAM) (e.g., a dynamic RAM, a static RAM), a flash memory, a removable memory, and/or so forth. In some embodiments, data other than user policies that is related to operations of core network node 500 can also be stored in memory 510. For example, combinations of user IDs and passwords of potential users can be stored in memory 510, such that the identification of a user can be verified by core network node 500 upon a user ID and a password entered by the user being provided to core network node 500. For another example, information associated with tunneling packets to one or more access devices can be stored in memory 510, such that establishing a MPLS tunnel or a layer-3 tunnel with one of the access devices can be initialized by core network node 500.

FIG. 6 is a schematic illustration of a policy table 600 implemented in a core network node (e.g., core network node 500), which defines user policies based on a combination of a user identifier, a user IP address, a remote IP address, and a direction identifier, according to an embodiment. Policy table 600 has five columns of entries, shown as user 610, user IP address 620, remote IP address 630, direction 640, and policy 650. Each entry of policy table 600, including one entry of each of the five columns, collectively defines a policy (e.g., a down-link policy, an up-link policy) for controlling directional traffic (e.g., down-link traffic, up-link traffic) of one or more user sessions (e.g., wired sessions, wireless sessions) for a user.

Specifically, the first column, user 610, contains user identifiers (e.g., A, B, C, D, E), each of which uniquely identifies a user (e.g., a person identified by a combination of a user ID and a password) or a user communication device (e.g., a device identified by a MAC address) that is associated with a user session in a homogeneous enterprise network (e.g., homogeneous enterprise network 200). The second column, user IP address 620, contains IP addresses (e.g., 192.168.120.1, 192.168.120.2, 192.168.120.3, 192.168.x.x where x represents any integer value between 0 and 255), each of which identifies one IP address or a group of IP addresses for a wired device or a wireless device used by the user to access the homogeneous enterprise network. The third column, remote IP address 630, contains IP addresses (e.g., 192.168.120.100, 192.168.x.x), each of which identifies one IP address or a group of IP addresses for the other entity that communicates with the user in a user session. The fourth column, direction 640, contains direction identifiers (e.g., down, up, bi), each of which indicates the direction for the traffic of the user session that is defined. As shown in FIG. 6, direction identifiers "down" and "up" indicate the policy is a down-link policy, or an up-link policy, respectively, and direction identifier "bi" indicates the policy can be both a down-link policy and an up-link policy. The fifth column, policy 650, contains control keywords (e.g., allow, deny, restrict), each of which indicates a policy for controlling packets associated with a user session. As shown in FIG. 6, control keyword "allow" indicates packets associated with the user session should be forwarded; control keyword "deny" indicates packets associated with the user session should be dropped; and control keyword "restrict" indicates packets associated with the user session should be forwarded under one or more certain restrictions, such as a maximum number of packets that can be forwarded, a maximum total size of packets that can be forwarded, etc. In some embodiments, information associated with the restrictions on certain user sessions that are indicated in one or more user policies in a policy table can be stored within the policy table (not shown in policy table 600). In some other embodiments, such information can be stored in a different data structure in the device (e.g., a core network node, an access network node, an access point) that hosts the policy table, and can be located by information associated with the user policies (e.g., a combination of user identifier, user IP address, and remote IP address), or a pointer linked to one of the user policies that is stored in the policy table (not shown in policy table 600).

Although not shown in FIG. 6, it should be understood that a policy table can include other identifies and types of information to identify a policy. For example, a policy can be identified by such identifiers or information as, for example, a source port identifier, a destination port identifier, a protocol identifier, an application identifier, etc.

In a homogeneous enterprise network, as described herein, a common user policy can be applied to a user in a given user session independent of the user's location and access method. In other words, a user policy (e.g., a down-link policy, an up-link policy) for a user in a user session can be dependent on the user identifier and the remote IP address of the user session, but need not be dependent on the user IP address. For example, the first entry of user policies stored in policy table 600 is a down-link policy for user A, which defines that packets from a remote IP address 192.168.120.101 destined to any device associated with user A should be dropped, regardless of the user IP address for user A, as indicated by the user IP address x.x.x.x. For another example, the fifth entry of user policies stored in policy table 600 is an up-link policy for user C, which defines that packets from any device associated with user C destined to a remote IP address 192.168.120.200 should be forwarded, regardless of the user IP address for user C, as indicated by the user IP address x.x.x.x.

Furthermore, as described herein, a down-link policy can be enforced at a core network node to drop, forward, or restrict packets destined to a user within the homogeneous enterprise network. After a user is operatively coupled to an access device (e.g., an access network node, an access point) of the homogeneous enterprise network using a user communication device (e.g., a wired device, a wireless device), an IP address is assigned to the user communication device by the homogeneous enterprise network. A core network node (e.g., core network node 500 in FIG. 5) is then configured to update one or more down-link policy entries associated with the user in a policy database (e.g., policy table 512 in FIG. 5) stored in the core network node. Specifically, the core node is configured to replace a default user IP address (e.g., x.x.x.x) or any other form of user IP address in the down-link policy entries with the IP address assigned to the user communication device, such that the down-link policies can be implemented at the core network node to control traffic sent to the user through the core network node. Additionally, one or more up-link policy entries associated with the user are downloaded from the policy database to the access device of the user, such that the up-link policies can be implemented at the access device to control traffic sent from the user.

For example, as shown in the second entry of policy table 600, the user IP address in the down-link policy for user B is updated to 191.168.120.2, which is assigned to user B when user B is operatively coupled to the homogeneous enterprise network. As a result, a core network node is configured to enforce this down-link policy for user B, such that packets from an entity associated with the remote IP address 191.168.120.100 destined to the user IP address 192.168.120.2 (i.e., the IP address of user B) are forwarded by the core network node, based on the control keyword "allow".

For another example, as shown in the fourth entry of policy table 600, the user IP address in the down-link policy for user C is updated to 191.168.120.1, which is assigned to user C when user C is operatively coupled to the homogeneous enterprise network. As a result, a core network node is configured to enforce this down-link policy for user C, such that packets from an entity associated with the remote IP address 191.168.1.x destined to the user IP address 192.168.120.1 (i.e., the IP address of user C) are dropped by the core network node, based on the control keyword "deny".

In some embodiments, after a user is disassociated with the homogeneous enterprise network (e.g., a user is disassociated with a user communication device, a user communication device associated with a user is operatively decoupled from an access device), a core network node is configured to change the user IP address in the down-link policy entries associated with the user from the IP address assigned to the user communication device back to a default value. In the example of FIG. 6, after user B logs off from a user communication device (e.g., a wired device, a wireless device) operatively coupled to the homogeneous enterprise network, the core network node is configured to change the user IP address in the down-link policy associated with user B (i.e., the second entry of policy table 600) from 192.168.120.2 back to the default value of x.x.x.x.

In some other embodiments, after a user is disassociated with the homogeneous enterprise network, the user IP address in the down-link policy entries associated with the user in the policy database remains unchanged. Later, when the user is associated with the homogeneous enterprise network and assigned a new IP address again, the core network node is configured to change the user IP address in the down-link policy entries associated with the user from the previous value to a value of the IP address newly assigned to the user. In the example of FIG. 6, after the user communication device associated with user C is operatively decoupled from the homogeneous enterprise network, the user IP address in the down-link policy associated with user C (i.e., the fourth entry of policy table 600) remains unchanged as 192.168.120.1.

In contrast to the down-link policies enforced at the core network nodes, an up-link policy can be downloaded to and enforced at an access device to drop, forward, or restrict packets originated from a user within the homogeneous enterprise network. After a user is operatively coupled to an access device (e.g., an access network node, an access point) of the homogeneous enterprise network using a user communication device (e.g., a wired device, a wireless device), the access device is configured to send an initiation signal to a core network node (e.g., core network node 500 in FIG. 5) operatively coupled to the access device, indicating the association of the user with the access device. In response to receiving the initiation signal, the core network node is configured to determine one or more up-link policies associated with the user in a policy database (e.g., policy table 512 in FIG. 5) stored in the core network node, based on a user identifier of the user or the user communication device. The core network node is then configured to send the up-link policies associated with the user to the access device operatively coupled to the user. Thus, the up-link policies associated with the user are downloaded to a policy database (e.g., policy table 312 in FIG. 3, policy table 412 in FIG. 4) stored in the access device, and enforced at the access device on packets sent from the user. Accordingly, the access device can enforce the up-link policies associated with the user before forwarding a packet received from a user communication device to the core network node via a tunnel, as described in more detail in reference to FIG. 7.

FIG. 7 is a schematic illustration of two up-link policy tables 701, 702 implemented in two access devices (e.g., access point 300 and access network node 400, respectively), which define user up-link policies based on a combination of a user identifier, a user IP address, and a remote IP address, according to an embodiment. Up-link policy table 701 or 702 has four columns, shown as user 710, user IP address 720, remote IP address 730, and policy 740. Each entry of policy table 701 or 702, including one entry of each of the four columns, collectively defines an up-link policy for controlling up-link traffic in one or more user sessions (e.g., wired sessions, wireless sessions) sent from a user. Similar to the corresponding columns in policy table 600 shown and described with respect to FIG. 6, the first, the second, the third, and the fourth column of up-link policy table 701 or 702 contain user identifiers, user IP addresses, remote IP addresses, and control keywords of up-link policies, respectively. Different from policy table 600, policy table 701 or 702 does not have a column for direction identifiers, because only up-link policies are stored in up-link policy table 701 and 702.

As described above with respect to FIG. 6, an up-link policy can be downloaded to and enforced at an access device. Specifically, an up-link policy associated with a user can be retrieved from a policy database (e.g., policy table 600) stored in a core network node, downloaded to a policy database (e.g., up-link policy table 701, up-link policy table 702) stored in an access device associated with the user and operatively coupled to the core network node, and enforced at the access device.

For example, up-link policy table 701 can be stored as a policy database in an access network node (e.g., policy table 412 in access network node 400 in FIG. 4) of the homogeneous enterprise network, and policy table 600 can be stored as a policy database in a core network node (e.g., policy table 512 in core network node 500 in FIG. 5) operatively coupled to the access network node. After user B is operatively coupled to the access network node using a wired device, the wired device is assigned an IP address 192.168.120.2, as reflected by the second entry of policy table 600 in FIG. 6. The third entry stored in policy table 600 is determined as an up-link policy associated with user B, based on the user identifier of user B. The up-link policy associated with user B is then downloaded from the core network node to the access network node, and stored as the first entry in up-link policy table 701. Thus, this up-link policy is enforced at the access network node such that any packet sent from the wired device associated with the IP address 192.168.120.2 destined to an entity associated with the IP address 192.168.120.200 is dropped by the access network node, based on the control keyword "deny".

Similarly stated, for another example, up-link policy table 702 can be stored as a policy database in an access point (e.g., policy table 312 in access point 300 in FIG. 3) of the homogeneous enterprise network, and policy table 600 can be stored as a policy database in a core network node operatively coupled to the access point. After user C is operatively coupled to the access point using a wireless device, the wireless device is assigned an IP address 192.168.120.1, as reflected by the fourth entry of policy table 600 in FIG. 6. The fifth entry stored in policy table 600 is determined as an up-link policy associated with user C, based on the user identifier of user C. The up-link policy associated with user C is then downloaded from the core network node to the access point, and stored as the first entry in up-link policy table 702. Thus, this up-link policy is enforced at the access point, such that every packet sent from the wireless device associated with the IP address 192.168.120.1 destined to an entity associated with the IP address 192.168.120.200 is forwarded by the access point, based on the control keyword "allow".

In some embodiments, as shown and described with respect to FIG. 6, a bi-directional user policy stored in a policy database in a core network node can be both a down-link policy and an up-link policy. For example, the sixth and the seventh entry in policy table 600 are identified as bi-directional policies for user D and user E, respectively. When a user associated with a bi-directional policy is operatively coupled to the homogeneous enterprise network, the bi-directional policy is enforced as a down-link policy for the user at a core network node, and also downloaded to and enforced as an up-link policy for the user at an access device associated with the user and operatively coupled to the core network node.

For example, as shown in FIG. 6 and FIG. 7, after a user communication device associated with user E is operatively coupled to the access point that user C is currently connected to, user E is assigned an IP address 192.168.120.3, as reflected by the seventh entry of policy table 600 in FIG. 6. The seventh entry stored in policy table 600 is determined as a bi-directional policy associated with user E, based on the user identifier of user E. As a result, the user IP address of the policy entry associated with user E is replaced by the IP address assigned to user E, 192.168.120.3. A core network node hosting policy table 600 and operatively coupled to the user communication device for user E is configured to enforce this policy as a down-link policy for user E at the core network node, such that packets from an entity associated with an IP address 192.168.x.x and destined to the user communication device associated with the IP address 192.168.120.3 are forwarded by the core network node under certain restrictions, based on the control keyword "restrict". On the other hand, the same policy associated with user E is downloaded to the access point, and stored as the second entry of up-link policy table 702 in the access point. Thus, the policy is enforced as an up-link policy for user E at the access point, such that every packet sent from the user communication device associated with the IP address 192.168.120.3 destined to an entity associated with an IP address 192.168.x.x is forwarded by the access point under certain restrictions, based on the control keyword "restrict".

Figure 8:
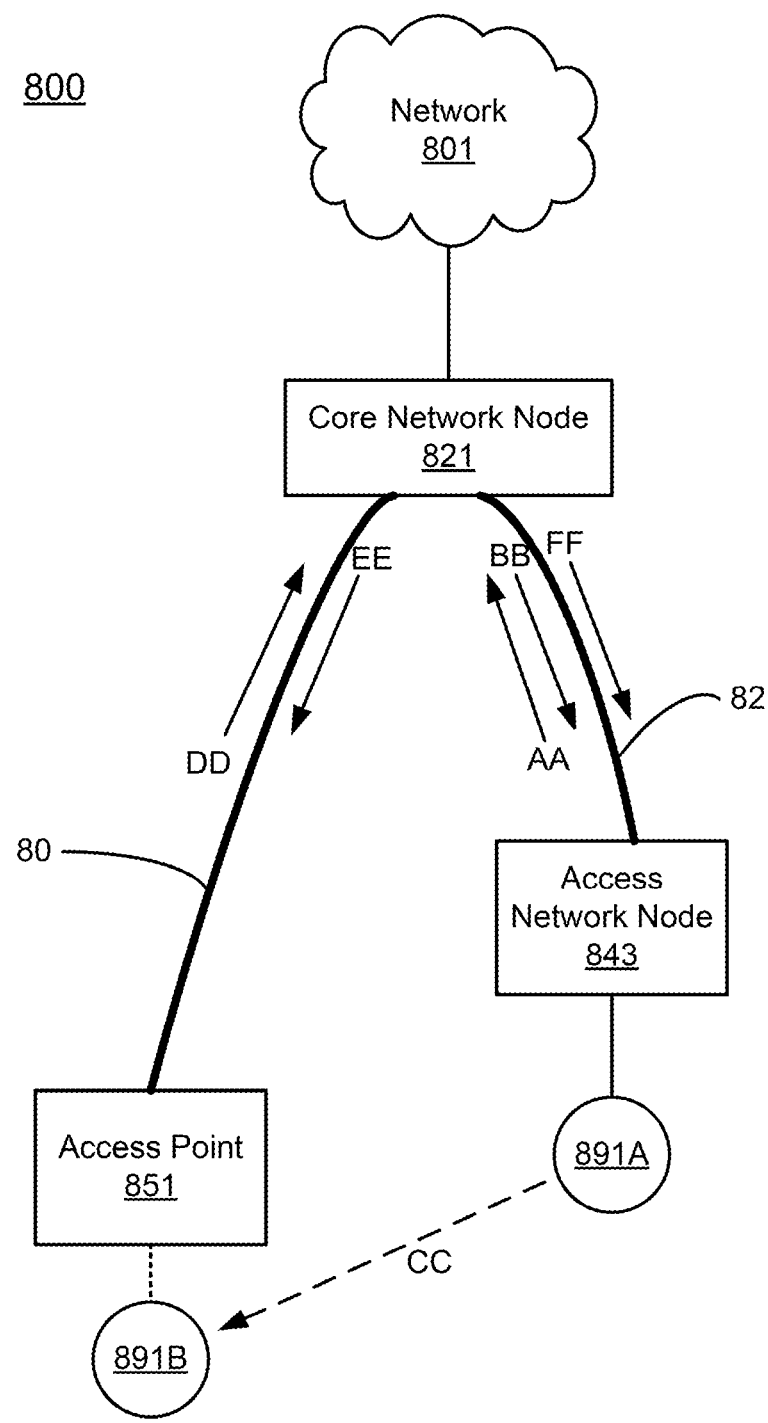
FIG. 8 is a schematic illustration of enforcing user policies in a homogeneous enterprise network when a user moves from one access device to another access device, according to an embodiment.

FIG. 8 is a schematic illustration of enforcing user policies in a homogeneous enterprise network 800 when a user moves from one access device (e.g., access network node 843) to another access device (e.g., access point 851), according to an embodiment. Similar to the homogeneous enterprise network 200 shown in FIG. 2, the homogeneous enterprise network 800 includes a core network node 821, an access network node 843, and an access point 851. The core network node 821 is operatively coupled to access network node 843, access point 851, and a network 801. Similar to the core network nodes, access network nodes, and access points of the homogeneous enterprise network 200, packets, including data packets and control packets, can be transmitted between core network node 821 and access point 851 via a layer-3 tunnel or a MPLS tunnel (i.e., the tunnel represented by 80) through one or more intervening wired network nodes (not shown in FIG. 8), and between core network node 821 and access network node 843 via another layer-3 tunnel or another MPLS tunnel (i.e., the tunnel represented by 82) through one or more intervening wired network nodes (not shown in FIG. 8). The intervening wired network nodes can include an aggregation network node and/or an access network node.

As shown in FIG. 8, when a user is operatively coupled to access network node 843 using wired device 891A, access network node 843 is configured to send an initiation signal AA to core network node 821, indicating the association of the user with access network node 843. In response to receiving the initiation signal AA, core network node 821 is configured to send an up-link policy associated with the user to access network node 843 using a signal BB, over the tunnel 82. Thus, access network node 843 is configured to store the received up-link policy associated with the user in a policy database (e.g., policy table 412 in FIG. 4) in access network node 843, and further enforce the up-link policy for the user at access network node 843. Meanwhile, core network node 821 is configured to enforce one or more down-link policies associated with the user on packets received at core network node 821 that are destined to the user at wired device 891A.

Later, the user is disassociated with access network node 843, and then operatively coupled to access point 851 using wireless device 891B, shown as path CC in FIG. 8. In some embodiments, wired device 891A and wireless device 891B can be two distinct devices, such as a desktop computer and a mobile phone, respectively. In such embodiments, the user can be disassociated with wired device 891A, and then be associated with wireless device 891B. For example, the user logs off from a user session on the desktop, and then logs onto a user session again using the mobile phone. In some other embodiments, wired device 891A and wireless device 891B can be a single device, such as a Wi-Fi enabled laptop. In such embodiments, the device (i.e., wired device 891A, or equivalently, wireless device 891B) can be operatively decoupled from access network node 843, and then operatively coupled to access point 851. For example, the user disconnects the Wi-Fi enabled laptop from a port of an access network node of a wired local area network (LAN), and then connects the Wi-Fi enabled laptop to a wireless access point (WAP) of the wired local area network.

After the user is operatively coupled to access point 851 using wireless device 891B, access point 851 is configured to send an initiation signal DD to core network node 821, indicating the association of the user with access point 851. In response to receiving the initiation signal DD, the core network node is configured to send the up-link policy associated with the user to access point 851 using a signal EE, over the tunnel 80. The up-link policy sent to access point 851 using signal EE is same as the up-link policy sent to access network node 843 using signal BB. Thus, access point 851 is configured to store the received up-link policy associated with the user in a policy database (e.g., policy table 312 in FIG. 3) in access point 851, and further enforce the up-link policy for the user at access point 851. Meanwhile, core network node 821 is configured to enforce one or more down-link policies associated with the user on packets received at core network node 821 that are destined to the user at wireless device 891B.

As described in detail with respect to FIG. 4, in some embodiments, access network node 843 can be configured to automatically remove the up-link policy associated with the user from the policy database in access network node 843, for example, a predetermined amount of time after the user is disassociated with access network node 843. In some other embodiments, access network node 843 can be configured to remove the up-link policy associated with the user from the policy database in access network node 843 based on an instruction signal FF received from core network node 821, as shown in FIG. 8. The instruction signal FF can be sent from core network node 821 to access network node 843 as a result of core network node 821 being notified, by the initiation signal DD, that the user is no longer associated with access network node 843. In this case, core network node 821 is configured to send the instruction signal FF after receiving the instruction signal DD. Alternatively, core network node 821 can be configured to send the instruction signal FF to access network node 843 after receiving a signal (not shown in FIG. 8) from access network node 843, indicating that the user is no longer associated with access network node 843 (e.g., inactive for a predetermined period of time). In this case, the instruction signal FF is sent by core network node 821 independent of the instruction signal DD.

Figure 9:
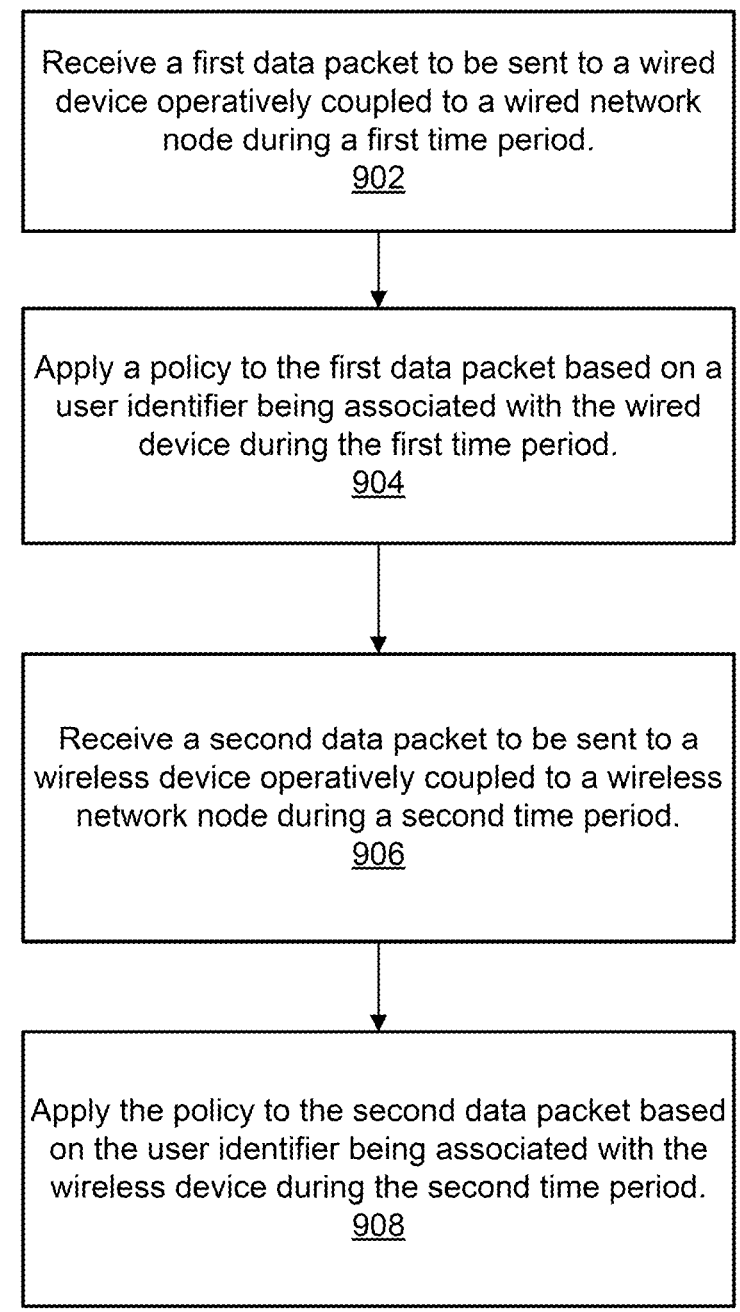
FIG. 9 is a flow chart of a method for applying a common user policy for a user accessing by different access methods, according to an embodiment.

FIG. 9 is a flow chart of a method for applying a common user policy for a user accessing by different access methods, according to an embodiment. At 902, a first data packet to be sent to a wired device operatively coupled to a wired network node can be received at a core network node during a first time period. Specifically, the first data packet can be associated with a first user session, i.e., to be sent from a remote device associated with a remote IP address and destined to a user associated with a first user IP address. The first user IP address is the IP address assigned to the wired device when the user is associated with the wired device during the first time period. The core network node is operatively coupled to the wired network node and the wired device, and hosts a policy database (e.g., policy table 600) that stores one or more down-link policies and/or up-link policies for the user.

In the example of FIG. 8, when a user is associated with wired device 891A operatively coupled to access network node 843 during a first time period, a first data packet sent from a remote device in network 801 to wired device 891A is received at core network node 821. The first data packet is associated with a first user session and is to be sent from the remote device associated with a remote IP address to a user associated with a first user IP address, when the user is associated with wired device 891A during the first time period.

At 904, a policy can be applied by the core network node to the first data packet based on a user identifier being associated with the wired device during the first time period. After the user is initially operatively coupled to the wired device and assigned the first user IP address, one or more down-link policy entries stored in the policy database in the core network node and associated with the user can be determined, based on an identifier of the user (e.g., user identifier in policy table 600). The user IP addresses in these down-link policy entries are then updated to the first user IP address, based on the user identifier being associated with the wired device during the first time period. After the first data packet is received at the core network node, a down-link policy entry associated with the first user session that includes the first data packet can be determined, based on the source IP address and the destination IP address included in the first data packet matching the remote IP address and the user IP address stored in the down-link policy entry, respectively. As a result, the core network node is configured to apply this down-link policy to the first data packet.

In the example of FIG. 8, after the user is initially operatively coupled to wired device 891A and assigned the first user IP address, one or more down-link policy entries stored in the policy database in core network node 821 and associated with the user can be determined, based on an identifier of the user. The user IP addresses in these down-link policy entries are then updated to the first user IP address, based on the user identifier being associated with wired device 891A during the first time period. After the first data packet is received at core network node 821, a down-link policy entry associated with the first user session that includes the first data packet can be determined, based on the source IP address and the destination IP address included in the first data packet matching the remote IP address and the user IP address stored in the down-link policy entry, respectively. As a result, core network node 821 is configured to apply this down-link policy to the first data packet.

At 906, a second data packet to be sent to a wireless device operatively coupled to a wireless network node can be received at a core network node during a second time period. Specifically, the user associated with the wired device during the first time period can be associated with the wireless device during the second time period. For example, the user can log off from the wired device and later log on to the wireless device. The second data packet can be associated with a second user session, i.e., to be sent from a remote device associated with the same remote IP address and destined to the same user associated with a second user IP address. In some embodiments, the remote device in the second user session can be a different device from the remote device in the first user session, and the two remote devices can be associated with the same remote IP address during two different time periods (i.e., the first time period and the second time period), respectively. The second user IP address is the IP address assigned to the wireless device when the user is associated with the wireless device during the second time period.

In the example of FIG. 8, when the user is disassociated with wired device 891A, and associated with wireless device 891B operatively coupled to access point 851 during a second time period, a second data packet sent from a remote device in network 801 to wireless device 891B is received at core network node 821. The second data packet is associated with a second user session and is to be sent from the remove device associated with the same remote IP address as the one in the first user session, to the same user assigned a second user IP address, when the user is associated with wireless device 891B during the second time period.

At 908, the policy can be applied by the core network node to the second data packet based on the user identifier being associated with the wireless device during the second time period. Similar to the step of 904, after the user is initially operatively coupled to the wireless device and assigned the second user IP address, the user IP addresses in the down-link policy entries associated with the user are updated to the second user IP address, based on the user identifier being associated with the wireless device during the second time period. After the second data packet is received at the core network node, a down-link policy entry associated with the second user session that includes the second data packet can be determined, based on the source IP address and the destination IP address included in the second data packet matching the remote IP address and the user IP address stored in the down-link policy entry, respectively. The determined down-link policy entry for the second user session is essentially the same as the down-link policy entry for the first user session, based on the same user identifier and remote IP address. As a result, the core network node is configured to apply the same down-link policy to the second data packet as the one applied to the first data packet.

In the example of FIG. 8, after the user is initially operatively coupled to wireless device 891B and assigned the second user IP address, the user IP addresses in the down-link policy entries associated with the user are updated to the second user IP address, based on the user identifier being associated with wireless device 891B during the second time period. After the second data packet is received at core network node 821, a down-link policy entry associated with the second user session that includes the second data packet can be determined, based on the source IP address and the destination IP address included in the second data packet matching the remote IP address and the user IP address stored in the down-link policy entry, respectively. The determined down-link policy entry for the second user session is essentially the same as the down-link policy entry for the first user session, based on the same user identifier and remote IP address. As a result, core network node 821 is configured to apply the same down-link policy to the second data packet as the one applied to the first data packet.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 1 as aggregation network nodes 131-132 with their associated access network nodes 141-144 and access points 151-152 comprising a pod, in other embodiments, a pod can include less than two or more than two aggregation network nodes and their associated access devices (e.g., access network nodes, access points). As described herein, a pod is defined as a collection of aggregation network nodes and associated access devices having a common connection to a redundant set of core network nodes. Furthermore, while shown and described above with respect to FIGS. 1 and 2 as a redundant set of core network nodes connected to a pod including two core network nodes, in other embodiments, such a redundant set of core network nodes can include more than two core network nodes. For example, a cluster of any number (e.g., 3, 4, 5, etc.) of core network nodes can be coupled to a pod of aggregation network nodes and their associated access devices. Each core network node in the cluster of core network nodes can function as a controller, a hop and/or a switch for the network devices included in the pod associated with the cluster of core network nodes.

While shown and described above with respect to FIG. 5 as control module 524 being included in core network node 500, in other embodiments, a control module can be separate from and operatively coupled to a core network node. In some embodiments, a control module can be located on a separate device that is operatively coupled to a core network node. In such an example, the control module can be configured to manage wired and/or wireless sessions and apply user policies to wired and/or wireless sessions by sending signals (e.g., control signals) to and receiving signals from the core network node. For example, the control module can send a control signal to a tunnel module in the core network node, instructing the tunnel module to encapsulate or decapsulate a received packet, according to a predetermined tunneling protocol (e.g., a layer-3 tunneling protocol, MPLS). For another example, the control module can send a control signal to a processor of the core network node, instructing the processor to compare information associated with a user session with data stored in a policy table within the core network node, such that an appropriate user policy can be determined and applied on the user session.

While shown and described above with respect to FIGS. 3-5 as policy table 312, policy table 412, and policy table 512 being stored within access point 300, access network node 400, and core network node 500, respectively, in other embodiments, a policy table can be stored in a memory separate from and operatively coupled to an access point, an access network node, or a core network node. For example, a policy table can be stored in a memory located at a separate device that is operatively coupled to a core network node. In such an example, the core network node can be configured to access and manipulate the policy table by sending signals to and receiving signals from the device that hosts the policy table. Specifically, the core network node can be configured to receive signals containing information of a specific policy entry in the policy table from the device. The core network node can also be configured to send signals to the device, instructing a specific user IP address in one or more policy entries in the policy table to be changed.

While shown and described above with respect to FIGS. 6-7 where policy table 600 and up-link policy table 701, 702 include data for each of the multiple fields for each user, a user policy entry can include data for less than all of the fields. That is, a user policy entry does not necessarily need to include data for all of the fields (i.e., user identifier, user IP address, remote IP address, direction identifier) except for the policy field, for the user policy entry to be stored in a policy table or an up-link policy table, and to be applied by an entity (e.g., a core network node, an access device). For example, a user policy entry with a user identifier "F", a direction identifier "down", and a policy keyword "deny" (and without data for the user IP address or remote IP address) indicates all down-link packets destined to a user associated with the user identifier "F" should be dropped, regardless of the user IP address or the remote IP address of the packets. For another example, a user policy entry with a user IP address "192.168.120.10", a direction identifier "up", and a policy keyword "allow" (and without data for the user identity or the remote IP address) indicates all up-link packets from a device associated with the IP address "192.168.120.10" should be forwarded, regardless of the user identifier or the remote IP address of the packets.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method, comprising:
receiving at a core network node configured to be operatively coupled to a plurality of wired network nodes, and at a first time, a first data packet to be sent to a wired device operatively coupled to a wired network node from the plurality of wired network nodes;
receiving, at the core network node and at a second time, a second data packet to be sent to a wireless device operatively coupled to a wireless network node from the plurality of wireless network nodes;
applying a common down-link policy to the first data packet and the second data packet based on an identifier of a user associated with both the wireless device and the wired device;
sending a common up-link policy to the wired network node without sending the common down-link policy to the wired network node such that (1) the wired network node applies the common up-link policy to a third data packet received from the wired device based on the identifier of the user, and (2) the wired network node does not apply the down-link policy to data packets to be sent to the wired device; and
sending the common up-link policy to the wireless network node without sending the common down-link policy to the wireless network node such that (1) the wireless network node applies the common up-link policy to a fourth data packet received from the wireless device based on the identifier of the user, and (2) the wireless network node does not apply the down-link policy to data packets to be sent to the wireless device.

2. The method of claim 1, wherein the sending the common up-link policy to the wired network node includes sending the common up-link policy to the wired network node prior to the first time, the method further comprising:
sending, during a timer period that includes the second time, an instruction to remove the common up-link policy from the wired network node.

3. The method of claim 1, wherein the sending the up-link policy to the wireless network node includes sending the common up-link policy to the wireless network node in response to the user connecting to the wireless network node using the wireless device, the method further comprising:
sending an instruction to remove the common up-link policy from the wireless network node in response to the wireless device disconnecting from the wireless network node.

4. The method of claim 1, wherein the wireless device and the wired device are a single device.

5. The method of claim 1, wherein the wireless device and the wired device are distinct devices.

6. The method of claim 1, further comprising:
sending, in response to the receiving the first data packet, the first data packet to the wired network node via a multiprotocol label switching (MPLS) tunnel through an aggregation network node from the plurality of wired network nodes such that the aggregation network node does not store the common down-link policy or the common up-link policy.

7. The method of claim 1, further comprising:
associating, using a policy database, the common down-link policy and the common up-link policy with the identifier of the user, the policy database including at least one of an allow list or a deny list associated with access control policies for the user.

8. A non-transitory processor-readable medium storing code representing instructions to cause a processor to:
receive, during a first time period, a first data packet to be sent to a wired device, the wired device being operatively coupled to a first wired network node from a plurality of wired network nodes during the first time period, the code to cause the processor to receive the first data packet includes code to cause the processor to receive the first data packet via a multiprotocol label switching (MPLS) tunnel or a layer-3 protocol tunnel through an aggregation network node to which the first wired network node is operatively coupled;
apply a policy to the first data packet based on a user identifier being associated with the wired device during the first time period, the policy not being stored at the aggregation network node;
restrict the first data packet from being sent to the wired device based on (1) the policy being applied to the first data packet, and (2) the policy being applied to the first wired network node;
receive, during a second time period, a second data packet to be sent to the wired device, the wired device being operatively coupled to a second wired network node from the plurality of wired network nodes during the second time period;
apply the policy to the second data packet based on the user identifier being associated with the wired device during the second time period, and
allow the second data packet to be sent to the wired device based on (1) the policy being applied to the second data packet, and (2) the policy being applied to the second wired network node.

9. The non-transitory processor-readable medium of claim 8, further comprising code representing instructions to cause the processor to:
retrieve the policy from a policy database that associates the policy with the user identifier.

10. The non-transitory processor-readable medium of claim 8, further comprising code representing instructions to cause the processor to:
send an up-link policy to the first wired network node without sending a down-link policy to the first wired network node such that (1) the first wired network node applies the up-link policy to a third data packet received from the wired device based on the user identifier being associated with the wired device during the first time period, and (2) the first wired network node does not apply the down-link policy to data packets to be sent to the wired device; and
send the up-link policy to a wireless network node from a plurality of wireless network nodes without sending the down-link policy to the wireless network node such that (1) the wireless network node applies the up-link policy to a fourth data packet received from a wireless device based on the user identifier being associated with the wireless device during the second time period, and (2) the wireless network node does not apply the down-link policy to data packets to be sent to the wireless device, the wireless device being operatively coupled to the wireless network node.

11. The non-transitory processor-readable medium of claim 8, further comprising code representing instructions to cause the processor to:
   send, to the first wired network node during the first time period, an up-link policy such that the first wired network node stores and applies the up-link policy; and
   send, to the first wired network node after the first time period, an instruction to remove the up-link policy from a database at the first wired network node.

12. The non-transitory processor-readable medium of claim 10, wherein the wireless device and the wired device are a single device.

13. The non-transitory processor-readable medium of claim 10, wherein the wireless device and the wired device are distinct devices.

14. A system, comprising:
   a wired network node configured to receive, from a core network node via a tunnel through an aggregation network node to which the wired network node is operatively coupled, an up-link policy associated with a user such that the up-link policy is not stored at the aggregation network node, the wired network node configured to receive the up-link policy based on the user being associated with a wired device operatively coupled to the wired network node when the user is associated with the wired device, the wired network node configured to apply the up-link policy to a first data packet received from the wired device prior to sending the first data packet to the core network node the tunnel being a multiprotocol label switching MPLS tunnel or a layer-3 protocol tunnel; and
   the up-link policy being applied, at a wireless network node based on the user being associated with a wireless device operatively coupled to the wireless network node, to a second data packet received from the wireless device prior to sending the second data packet to the core network node.

15. The system of claim 14, wherein the wired network node is configured to remove the up-link policy from a policy database at the wired network node a predetermined amount of time after at least one of the user is disassociated with the wired device or the wired device is decoupled from the wired network node, the policy database including at least one of an allow list or a deny list associated with access control policies for the user.

16. The system of claim 14, wherein the wired network node includes a policy database that associates the up-link policy with an identifier of the wired device when the user is associated with the wired device, the policy database including at least one of an allow list or a deny list associated with access control policies for the user.

17. The system of claim 14, wherein the wired network node is configured to receive a third data packet from the core network node subsequent the core network node applying a down-link policy associated with the user to the third data packet when the user is associated with the wired device.

18. The system of claim 14, wherein the wired network node is configured to send an initiation signal to the core network node prior to receiving the up-link policy from the core network node.

* * * * *